US010007698B2

(12) United States Patent  (10) Patent No.: US 10,007,698 B2
Delafranier et al.  (45) Date of Patent: Jun. 26, 2018

(54) TABLE PARAMETERIZED FUNCTIONS IN DATABASE

(71) Applicants: Mark Delafranier, Waterloo (CA); Jeffrey J. Plager, Waterloo (CA); Muhammed Sharique, Margarpatta (IN); Vipul Sharma, Margarpatta (IN); Ivan T. Bowman, Hammonds Plains (CA); Anisoara Nica, Waterloo (CA); Anil K. Goel, Waterloo (CA); Steven A. Kirk, Chelmsford, MA (US)

(72) Inventors: Mark Delafranier, Waterloo (CA); Jeffrey J. Plager, Waterloo (CA); Muhammed Sharique, Margarpatta (IN); Vipul Sharma, Margarpatta (IN); Ivan T. Bowman, Hammonds Plains (CA); Anisoara Nica, Waterloo (CA); Anil K. Goel, Waterloo (CA); Steven A. Kirk, Chelmsford, MA (US)

(73) Assignee: SYBASE, INC., Dublin, CA (US)

( * ) Notice: Subject to any disclaimer, the term of this patent is extended or adjusted under 35 U.S.C. 154(b) by 137 days.

(21) Appl. No.: 13/687,157

(22) Filed: Nov. 28, 2012

(65) Prior Publication Data

US 2013/0138626 A1    May 30, 2013

Related U.S. Application Data

(60) Provisional application No. 61/564,134, filed on Nov. 28, 2011.

(51) Int. Cl.
*G06F 17/30* (2006.01)
*G06F 3/0484* (2013.01)

(52) U.S. Cl.
CPC .... *G06F 17/30442* (2013.01); *G06F 17/3097* (2013.01); *G06F 17/30421* (2013.01); *G06F 17/30864* (2013.01); *G06F 3/0484* (2013.01)

(58) Field of Classification Search
CPC ............ G06F 17/5022; G06F 17/5027; G06F 17/30448; G06F 17/5009; G06F 17/5045; G06F 17/30383; G06F 17/30421; G06F 17/30433; G06F 17/30442; G06F 17/30457; G06F 17/30477; G06F 17/3048; G06F 17/30557; G06F 17/30595;
(Continued)

(56) References Cited

U.S. PATENT DOCUMENTS 5,857,180 A * 1/1999 Hallmark ................ G06F 9/466
6,073,185 A * 6/2000 Meeker ............................ 710/1
(Continued)

*Primary Examiner* — Scott A. Waldron
*Assistant Examiner* — Andalib F Lodhi
(74) *Attorney, Agent, or Firm* — Sterne, Kessler, Goldstein & Fox P.L.L.C.

(57) ABSTRACT

Systems, methods and computer program product embodiments for providing table parameterized function (TPF) functionality in a database are disclosed herein. An embodiment includes defining a TPF in a database, wherein the definition of the TPF defines one or more parameters of the TPF, at least one of the parameters being a table parameter. A query is received that operates to call the TPF, wherein the query defines one or more input parameters, the input parameters comprising at least one table input parameter to be used as input for calling the TPF. The query is processed to produce a result, and the result of the query is returned.

25 Claims, 14 Drawing Sheets

(58) Field of Classification Search
CPC ......... G06F 17/30289; G06F 17/30336; G06F 17/30483; G06F 17/30569; G06F 17/245; G06F 17/30286; G06F 17/30303; G06F 17/30516; G06F 17/30572; G06F 3/0484; G06F 17/3097; G06F 17/30864; G06Q 30/0269
USPC .......................................... 707/713, 736, 769
See application file for complete search history.

(56) References Cited

U.S. PATENT DOCUMENTS

| | | | |
|---|---|---|---|
| 6,442,541 B1* | 8/2002 | Clark et al. ........................ 707/3 |
| 6,625,593 B1* | 9/2003 | Leung ............... G06F 17/30445 |
| 7,103,590 B1* | 9/2006 | Murthy ............. G06F 17/30483 |
| 7,685,030 B1* | 3/2010 | Lowry et al. .................... 705/30 |
| 7,870,120 B2* | 1/2011 | Andreev et al. ............... 707/713 |
| 7,966,340 B2* | 6/2011 | Friedman et al. ............. 707/764 |
| 8,005,836 B2* | 8/2011 | Ramesh et al. ............... 707/736 |
| 8,074,219 B2* | 12/2011 | Duffy et al. .................... 718/100 |
| 8,671,084 B2* | 3/2014 | Chowdhary ...... G06F 17/30306 707/695 |
| 8,863,156 B1* | 10/2014 | Lepanto .............. G06F 9/44521 719/328 |
| 2004/0117345 A1* | 6/2004 | Bamford et al. ................... 707/1 |
| 2005/0154715 A1* | 7/2005 | Yoaz et al. ........................ 707/3 |
| 2005/0172097 A1* | 8/2005 | Voigt .................... G06F 3/0613 711/170 |
| 2006/0005176 A1* | 1/2006 | Kawahara et al. ............ 717/149 |
| 2006/0235823 A1* | 10/2006 | Chong et al. ..................... 707/1 |
| 2007/0038658 A1* | 2/2007 | Ghosh ............... G06F 17/30445 |
| 2007/0136262 A1* | 6/2007 | Dettinger et al. ................. 707/4 |
| 2009/0077011 A1* | 3/2009 | Natarajan ......... G06F 17/30445 |
| 2009/0164412 A1* | 6/2009 | Bestgen ............ G06F 17/30545 |
| 2009/0292711 A1* | 11/2009 | Konik ................ G06F 17/3051 |
| 2010/0241827 A1* | 9/2010 | Yu .......................... H04L 12/44 712/30 |
| 2010/0306195 A1* | 12/2010 | Wagener et al. ............. 707/736 |
| 2011/0167056 A1* | 7/2011 | Khanolkar ........ G06F 17/30463 707/718 |
| 2012/0013539 A1* | 1/2012 | Hogan et al. .................. 345/173 |
| 2012/0117056 A1* | 5/2012 | Al-Omari ......... G06F 17/30445 707/714 |
| 2012/0303628 A1* | 11/2012 | Silvola ............. G06F 17/30339 707/741 |
| 2012/0330925 A1* | 12/2012 | Ramamurthy et al. ....... 707/718 |
| 2013/0031139 A1* | 1/2013 | Chen ................. G06F 17/30415 707/802 |

* cited by examiner

TABLE PARAMETERIZED FUNCTIONS IN DATABASE

CROSS-REFERENCE TO RELATED APPLICATION

This application claims the benefit of U.S. Provisional Application No. 61/564,134, "Table Parameterized Functions in IQ," filed Nov. 28, 2011, incorporated by reference herein.

BACKGROUND

Field

Embodiments relate to database systems, and more particularly to providing table parameterized function (TPF) functionality in a database.

Background

Sybase IQ is a world class leading analytic database server that enables a new generation of data analysis. Armed with gigabytes of corporate information loaded in Sybase IQ, customers can analyze and assess the results of strategic decisions at near realtime. Analytics and information continue to increase in quantity and complexity.

Not only is data growing, but there is also a growing number of sources that generate data. Information is gold to analytical organizations and they capture every last digital 1 and 0. As this information base grows, so does the level of complexity of the analysis. As the analytic sophistication increases, so does its value to the organization.

Google published details of MapReduce in 2004 and described a framework that was exploited to harness the power of massively parallel clusters of computers for solving computational problems of some of the largest datasets ever collected. The MapReduce functional programming paradigm has, in recent years, become extremely popular for massively parallel distributed computing and has developed a loyal customer base. Yahoo developed the Hadoop infrastructure for automating the scheduling needs for a MapReduce based programming model. In general, the majority of this work has tended to concentrate on data that lives in flat files. At the core of it, this paradigm is fairly simple and builds upon long known functional and parallel programming constructs.

The programming model differs from the declarative style of programming in SQL. There are significant ongoing efforts (e.g., PigLatin) to introduce some of the declarative power of SQL into the MapReduce framework.

The challenge for relational database server providers is to provide the functionality and expressive power of the MapReduce paradigm for data resident in databases. As an additional facility, database servers that target very large deployments need to provide facilities for exploiting massively parallel clusters of computers from within the umbrella of SQL while making it possible for customers to write computational logic in languages other than SQL.

BRIEF SUMMARY

Briefly stated, the embodiments include system, method, and computer program product embodiments, and combinations and sub-combinations thereof, for providing table parameterized function (TPF) functionality in a database.

Database engines must be able to deliver a richer analytical architecture that can scale to process big data. One fundamental analytical building block is the Table Parameterized Functions (TPFs) which enables a new class of analytical applications. In standard ANSI SQL, a function returns a value and can be used any place an expression can be used. However, a function cannot be used as is in a FROM clause. By contrast, a TPF can be used directly in a FROM clause when it returns a set of rows (e.g., a table). Thus, a TPF is not restricted to the definition of an ANSI SQL function. Table parameterized functions extend the concept of the user defined function (UDF) to support passing in both scalar parameters and table-valued parameters.

A table-valued UDF is a UDF (user defined function, defined in SQL or externally) that produces a set of row(s) and can be used as a table expression in the FROM clause of a SQL statement. A TPF is a table-valued UDF that accepts table-valued (non-scalar) input parameters in addition to scalar parameters and may be executed in parallel over row-sets partitions of the table parameters. This effectively means that TPFs can accept and process a set of input values for some input parameters and return a different set of output values. Core to the design of TPFs is that the query engine will support massive parallelization and distribution of these functions.

An embodiment includes defining a TPF in a database, wherein the definition of the TPF defines one or more parameters of the TPF, at least one of the parameters being a table parameter. A query is received that operates to call the TPF, wherein the query defines one or more input parameters, the input parameters comprising at least one table input parameter to be used as input for calling the TPF. The query is processed to produce a result, and the result of the query is returned.

The embodiment may optionally include several further features. The TPF may be implemented externally using a native application programming interface (API). Processing the query may occur on a distributed basis. Processing the query may further include partitioning the table input parameter or ordering the table input parameter according to the TPF definition. The TPF may be polymorphic and/or self-describing. A UDF is a polymorphic function if its input parameters, both scalar and table-valued, as well as its table-valued result set are not specified at CREATE time. A polymorphic UDF function can dynamically describe its polymorphic input parameters and its polymorphic result set at query build time. Such input parameters and the result set are dynamically negotiated between the server and the UDF at query build time.

In this way, TPFs may be defined in the context of a database, allowing subsequent receipt and processing of queries that call the TPF. By allowing the external functions to accept table valued parameters and to be processed in parallel in a distributed server environment, the fundamental power of the MapReduce programming paradigm can be made available to the SQL programmer from within the database server. The additional functionality needed to provide parallel scheduling functionality requires extending the traditional table function approach to handle arbitrary rowsets as input with user specified partitioning and ordering requirements on the input to table functions.

Further embodiments, features, and advantages, as well as the structure and operation of the various embodiments are described in detail below with reference to accompanying drawings.

BRIEF DESCRIPTION OF THE DRAWINGS

The accompanying drawings, which are incorporated herein and form part of the specification, illustrate embodiments and, together with the description, further serve to explain the principles and to enable a person skilled in the relevant art(s) to make and use the embodiments.

Figure 1A:
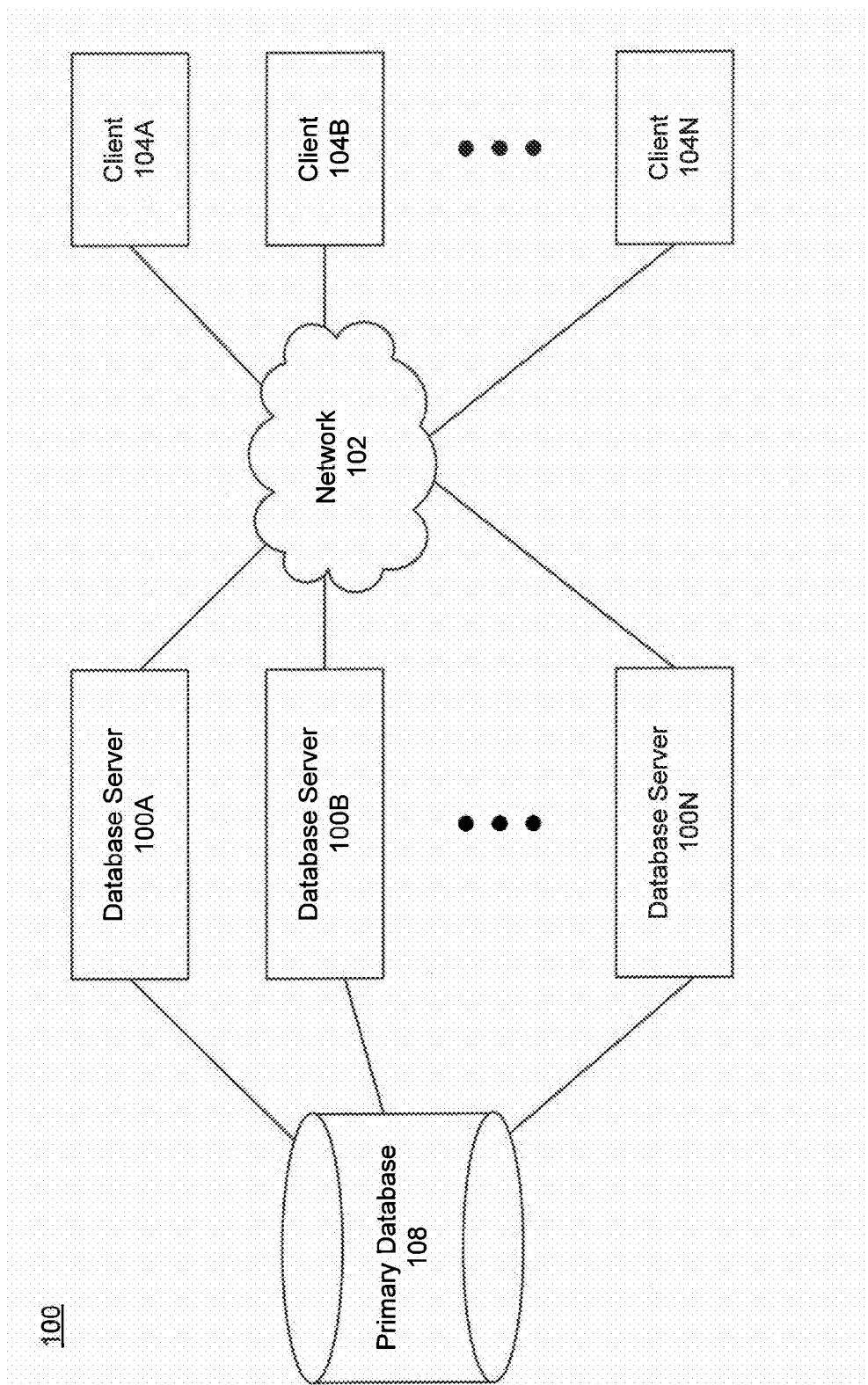
FIG. 1A is a diagram of an exemplary database client/server architecture, according to an embodiment.

The features and advantages of the present embodiments will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

Embodiments relate to systems, methods and computer program products for providing table parameterized function (TPF) functionality in a database.

While embodiments described herein are illustrative for particular applications, it should be understood that the embodiments are not limited thereto. Those skilled in the art with access to the teachings provided herein will recognize that the present disclosure includes additional modifications, applications, and embodiments within the scope thereof and additional fields in which the embodiments would be of significant utility.

Before an in-depth discussion of embodiments, the following table will be provided to define key terms that will be used in this specification in order to clarify their intended meanings.

TABLE 1

| | Definitions/Terminology |
|---|---|
| UDF (User Defined Function) | A User Defined Function is written in SQL or another language (C, Java, etc.). |
| External Environment | An External Environment is a language specific, vendor-supplied executable for interfacing the DBMS with user DLLs out of process. |
| External Function | An External Function is a non-SQL UDF deployed in a user DLL. It may run in-process inside the DBMS or out of process in an external environment. |
| Table-valued UDF or Table UDF | A table-valued UDF is a UDF (SQL or external) that produces a set of row(s) and can be used as a table expression in the FROM clause of a SQL statement. |
| TPF (Table Parameterized user defined Function) | A TPF is a table-valued UDF that accepts table-valued (non-scalar) input parameters in addition to scalar parameters and may be executed in parallel over row-sets partitions of the table parameters. |
| Polymorphic UDF | A UDF is a polymorphic function if its input parameters, both scalar and table-valued, as well as its table-valued result set, are not specified at CREATE time. |
| Self-describing UDF | A polymorphic UDF function that can dynamically describe its polymorphic input parameters and its polymorphic result set at query build time. Such input parameters and the result set are dynamically negotiated between the server and the UDF at query build time. |
| DQP | Distributed Query Processing |
| Map Reduce (MR) | A problem solving paradigm that is inherently distributed in nature and lends itself to massive parallelization. |
| Leader node | A node in multiplex which initializes the query execution in a DQP setup. This node is also responsible for distributing the work units to the individual worker nodes. |
| Worker node | A node in multiplex which executes the query fragment in leader node's context. |

This section describes a system 100 for providing table parameterized function (TPF) functionality in a database, according to an embodiment illustrated in FIGS. 1A-E.

As introduced above, a TPF is a new feature of a database that is presented herein. A TPF is a type of user defined function (UDF), where a UDF is a function defined by a user in the context of a database that accepts arguments and generates an output based on the arguments. UDFs may be defined in the database using a language such as SQL, or externally using languages such as C, C++, or Java. Some UDFs are table-valued UDFs or table UDFs, which have the property that their output is a table (i.e., a set of row(s)). The distinguishing feature of a TPF is that it is a UDF where at least one of the arguments is itself a table-valued parameter. This gives a UDF that is TPF the potential to process an input that includes at least one set of values and provide output based on such input.

FIG. 1A is a diagram of an exemplary database client/server architecture 100, according to an embodiment. FIG. 1A is illustrative of an example logical two-tier client/server architecture. In such an architecture, one or more database servers 100A, 100B . . . 100N, host primary database 108. Database servers 100A, 100B . . . 100N are connected to network 102, and through network 102 provide access to primary database 108 for one or more clients 104A, 104B . . . 104N. It may be noted that database servers 100A, 100B . . . 100N and clients 104A, 104B . . . 104N may include sites that are diskless clients, clients with disks, servers, and combined servers and clients.

Network 102 can be any type of network or combination of networks such as, but not limited to, a local area network, wide area network or the Internet. Network 102 can be a form of a wired network or a wireless network, or a combination thereof. Network 102 can allow primary database 108, database servers 100A, 100B . . . 100N, clients 104A, 104B . . . 104N and any other networked components to communicate with each other.

Components of system 100 (i.e., primary database 108, database servers 100A, 100B . . . 100N, and clients 104A, 104B . . . 104N) can be computing devices including one or more processors and may further include one or more modules implemented using one or more processors. Components of system 100 can include any form of physical storage such as hard-disk drives, flash drives, random access memory (RAM), and any computer-readable or computer-useable storage media that may be configured to store instructions and data. An example computer useful for implementing components of the embodiments is described further below.

However, FIG. 1A is only an example logical architecture that may be used by an embodiment. It may be noted that database servers 100A, 100B . . . 100N may be of varying types. For example, database server 100A may be a DBMS server, but other database servers 100B . . . 100N may have specialized functions, such as being a print server or a file server. As depicted, database servers 100A, 100B . . . 100N may host a distributed primary database 108, but primary database 108 may be hosted locally at one database server, such as database server 100A. The client/server architecture in FIG. 1A, as discussed, is an example, and other approaches may be used that provide a database management system (DBMS) that hosts a primary database 108 and additionally allows access to the DBMS, such as by queries.

Primary database 108 may be any form of database and can include, but is not limited to, a device having a processor and memory for executing and storing instructions. For example, the database (whether or not it is distributed) may be of a variety of types, including but not limited to, a relational database, an object database, an object-relational database, a hierarchical database, or a network database.

Primary database 108 may include software, firmware, and hardware or some combination thereof. The software may include one or more applications and an operating system. The hardware can include, but is not limited to, a processor, memory and user interface display. An optional input device, such as a mouse, stylus or any other pointing device, may be used.

Figure 1B:
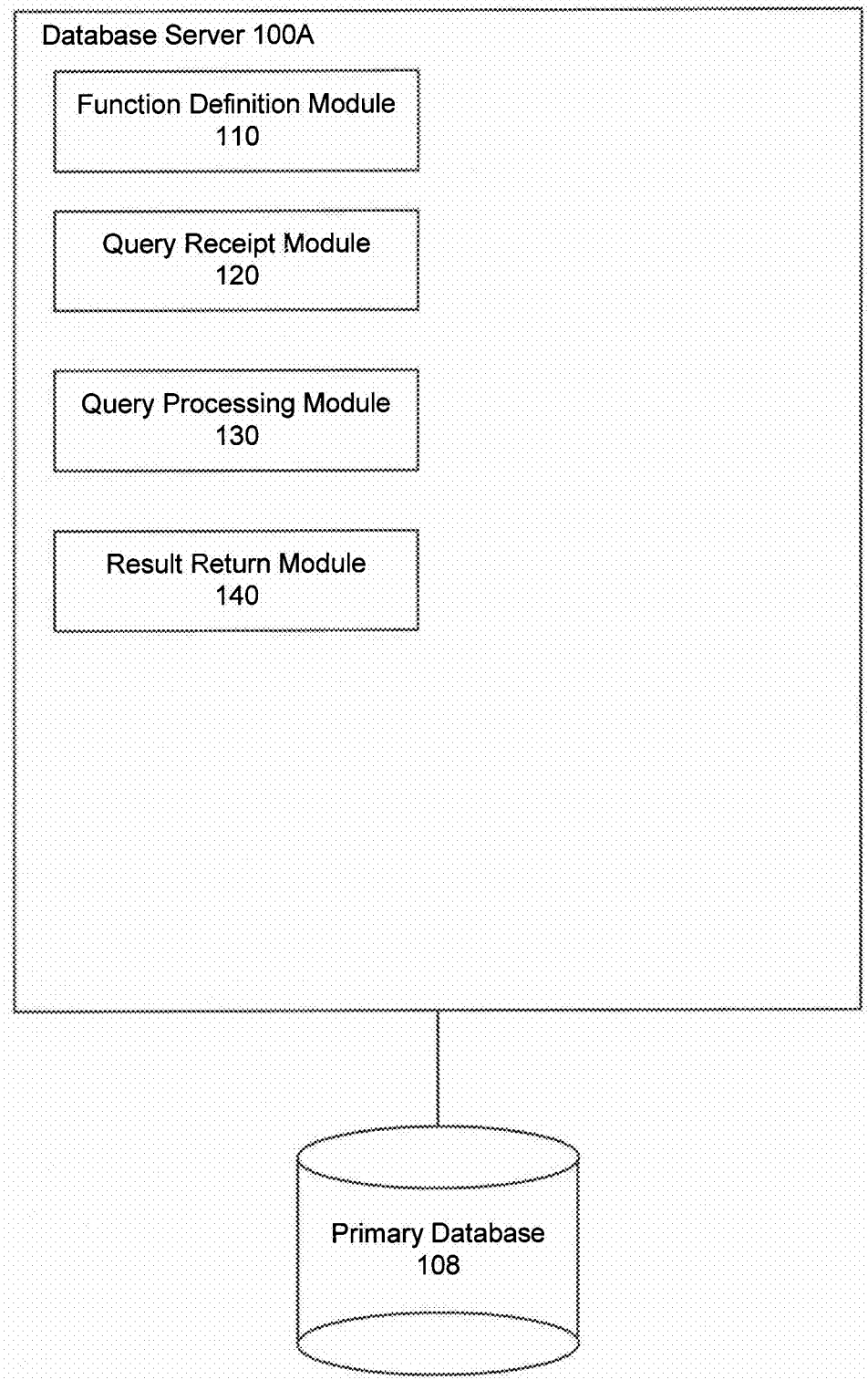
FIG. 1B is a diagram illustrating a database server, according to an embodiment.

FIG. 1B is a diagram illustrating a database server 100A, according to an embodiment. The illustrated database server 100A hosts primary database 108, either by itself or by hosting primary database 108 in a distributed architecture with other database servers 100B . . . 100N. Certain subsystems of database server 100A that help provide TPF functionality are depicted, including function definition module 110, query receipt module 120, query processing module 130, and result return module 140. It may be noted that database server 100A may include additional subsystems in addition to or in lieu of these subsystems, and not every embodiment will necessarily include all of the subsystems.

Function definition module 110 allows definition of a TPF in primary database 108. The definition may occur through use of a language such as SQL. Function definition module 110 defines a TPF. Defining a TPF allows queries to call the TPF. Additionally, the definition specifies parameters for the TPF, at least one of the parameters being a table parameter. Function definition module 110 establishes what the output of the TPF should look like, and instructs primary database 108 where it should look for the definition of the TPF. More information about the operation of function definition module 110 is provided in conjunction with FIG. 3, below.

Query receipt module 120 receives a query that operates to call the TPF. For example, the query may be defined in SQL. The query defines input parameters for the TPF, and such that the input parameters include at least one table input parameter to be used as input for calling the TPF. More information about the operation of query receipt module 120 is provided in conjunction with FIG. 3, below. The query received by query receipt module 120 is passed to query processing module 130 for actual execution over primary database 108.

Figure 4A:
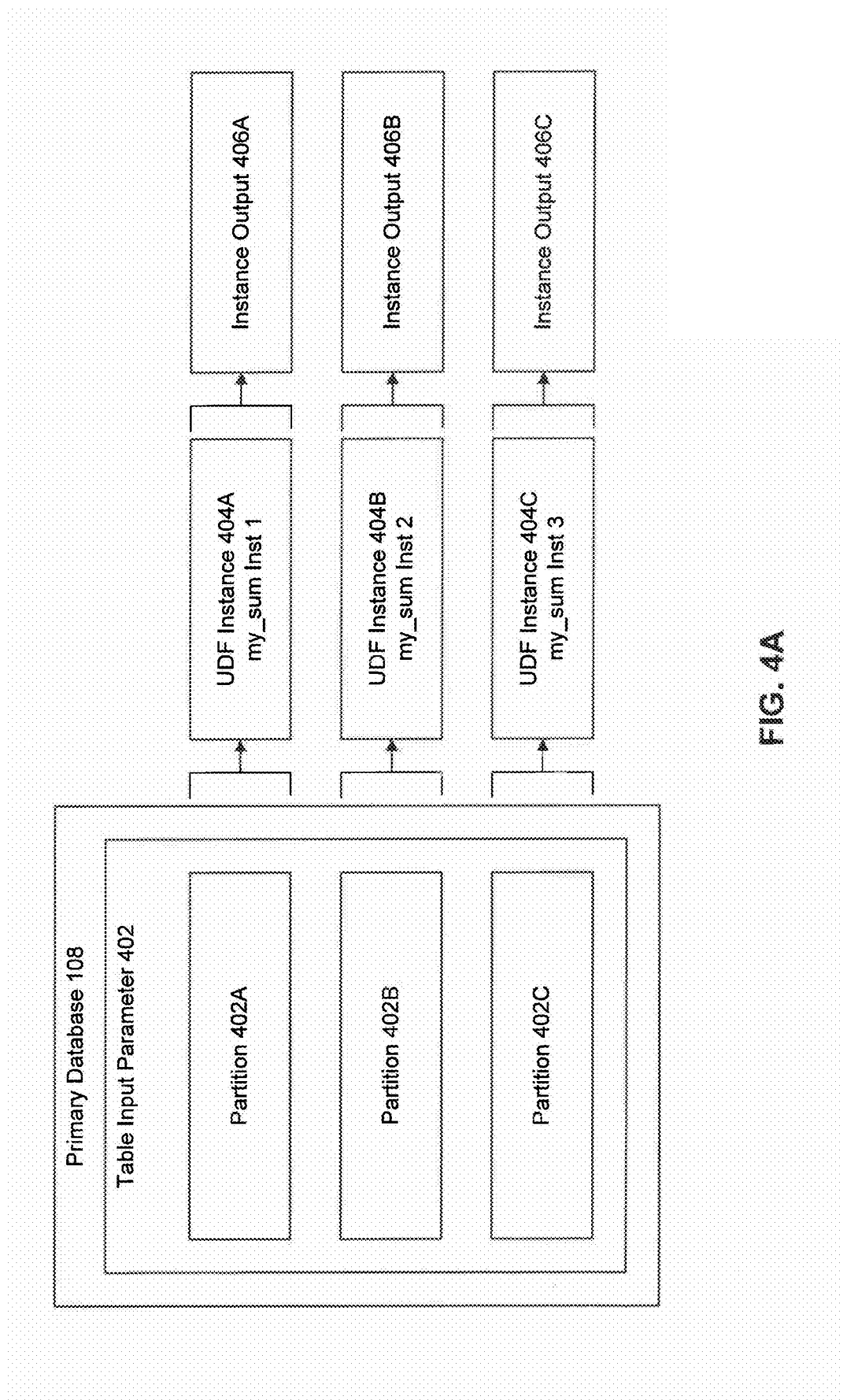
FIG. 4A is a dataflow diagram illustrating TPF processing that includes partitioning, according to an embodiment.
Figure 4B:
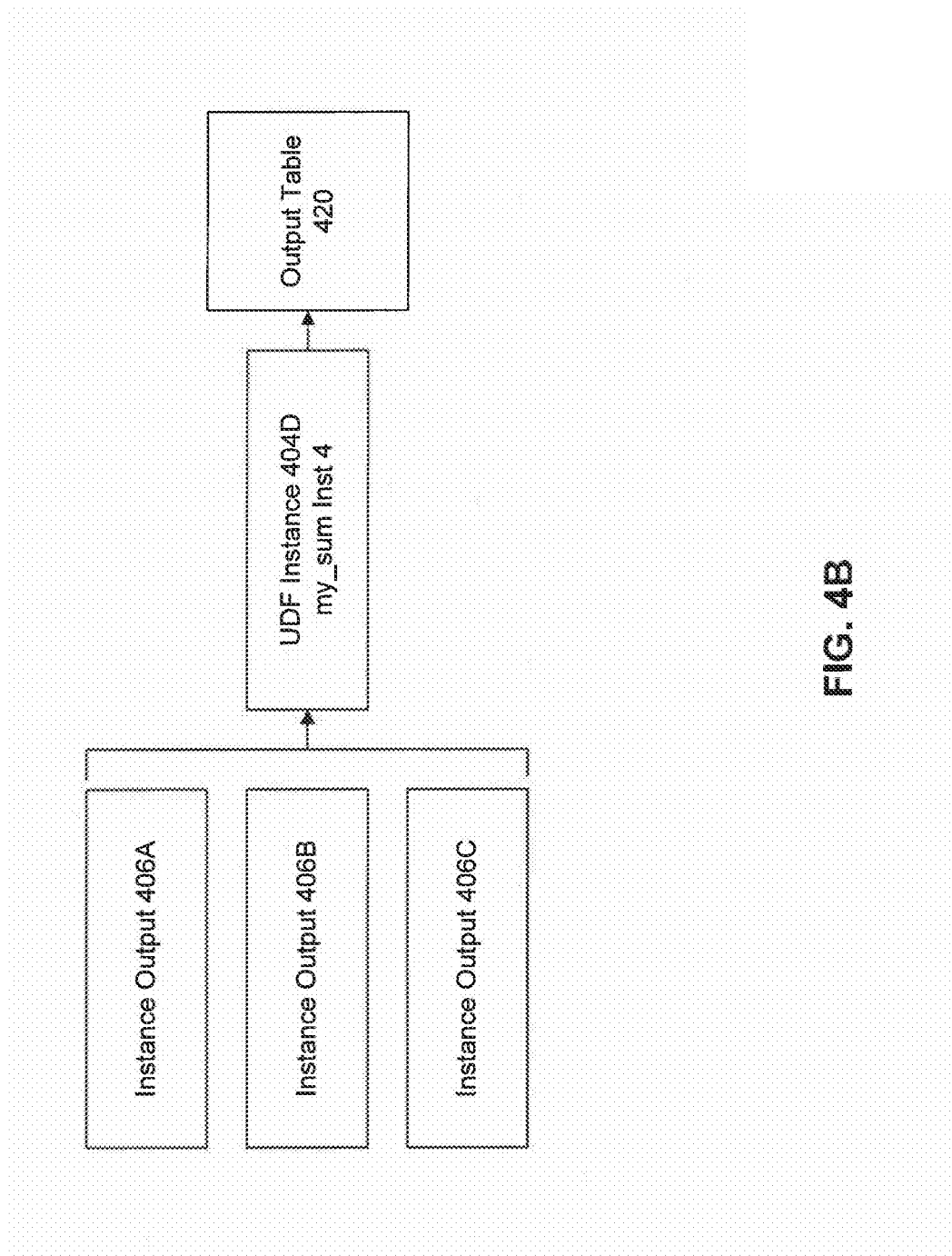
FIG. 4B is a dataflow diagram illustrating additional TPF processing that includes partitioning, according to an embodiment.
Figure 5:
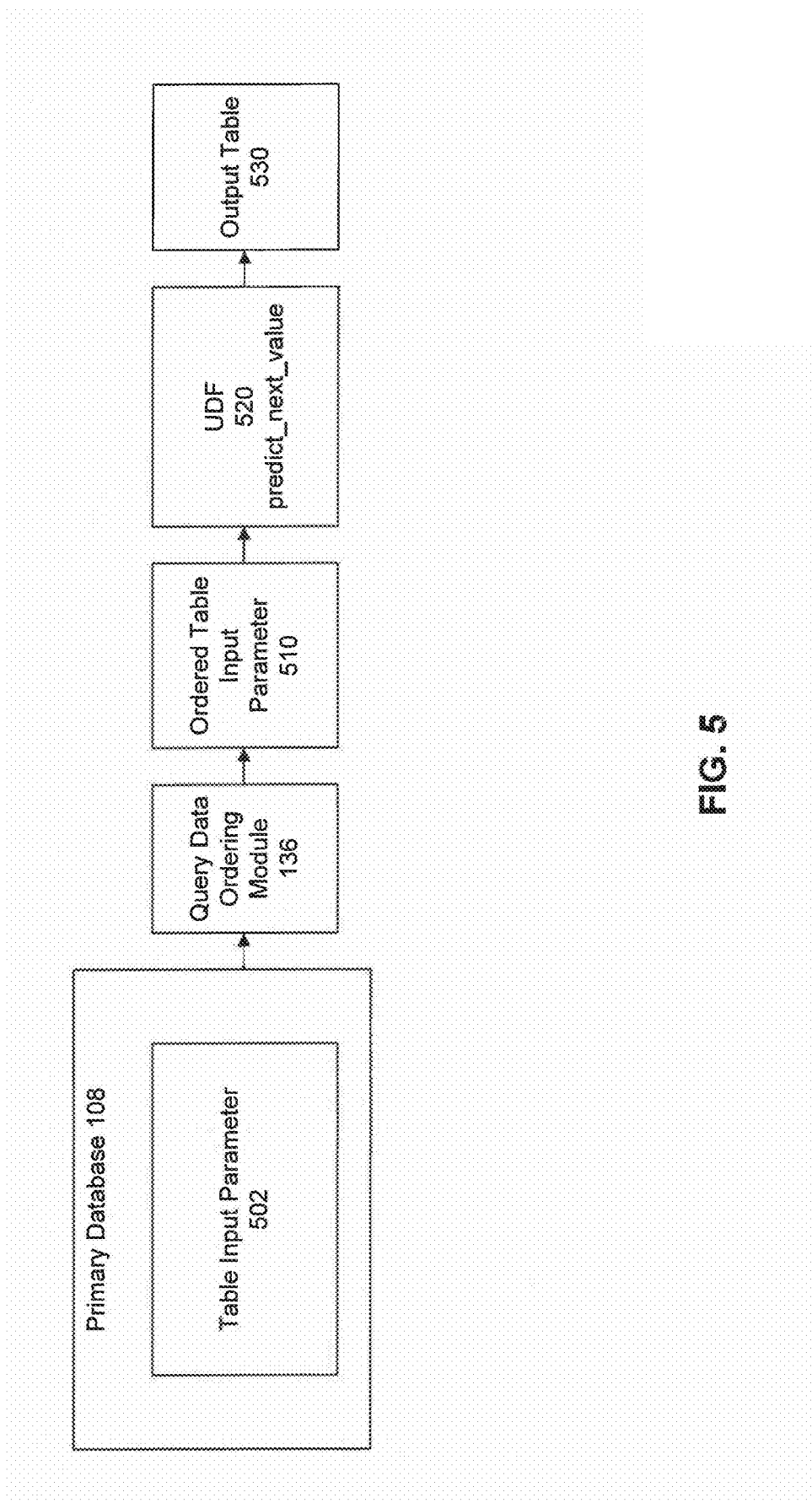
FIG. 5 is a flowchart illustrating TPF processing that includes ordering, according to an embodiment.

Query processing module 130 processes the query received by query receipt module 120 in order to obtain a result that may be returned by result return module 140. The operation of query processing module 130 is illustrated in greater depth in connection with FIGS. 3 and 6. Additionally, partitioning and ordering functionality provided by query processing module 130 are depicted in FIGS. 4A-B and 5.

Result return module 140 provides the results of processing the query, as generated by query processing module 130, to an appropriate receiving party.

Figure 1C:
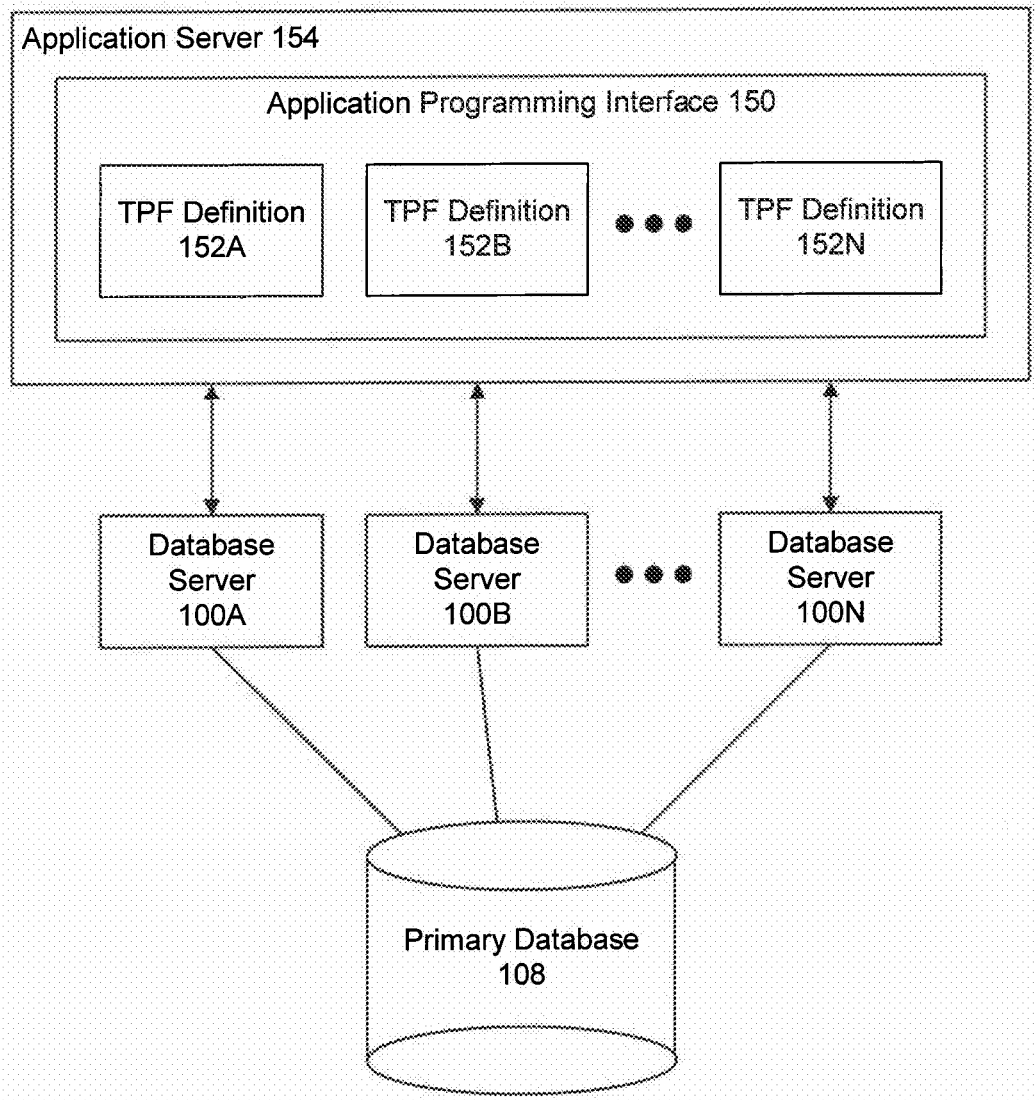
FIG. 1C is a diagram illustrating an interface between an application programming interface (API) and one or more database servers, according to an embodiment.

FIG. 1C is a diagram illustrating an interface between an application programming interface (API) and one or more database servers, according to an embodiment. In the context of FIG. 1C, each of the database servers 100A, 100B . . . 100N that hosts primary database 108 is depicted as being connected to an application programming interface 150 at an application server 154. Application programming interface 150 may also be alternative middleware (such as a web server). Within application programming interface 150, there may be a plurality of TPF definitions 152A, 152B . . . 152N.

The TPF definitions 152A, 152B . . . 152N are external implementations of the TPFs that have been defined for primary database 108. For example, API 150 may use native code, in a language such as C or C++, to provide implementations of the TPFs that may be run when query processing module 130 executes a query. However, the language choice is not limited to C or C++, and a wide variety of programming languages may be used to implement the TPFs. Pseudocode of an implementation of a TPF is provided in connection with FIG. 3, and described below.

Figure 1D:
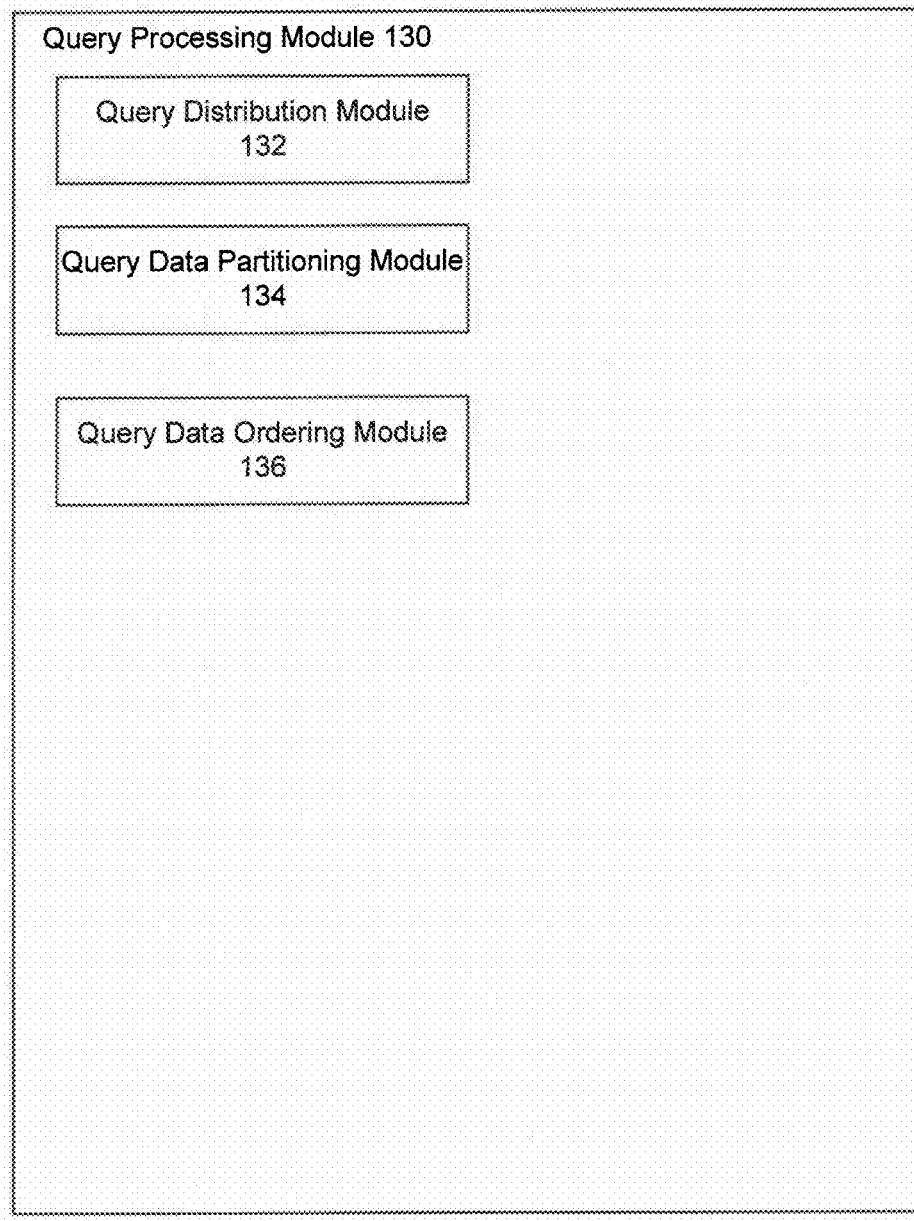
FIG. 1D is a diagram illustrating a query processing module, according to an embodiment.

FIG. 1D is a diagram illustrating a query processing module, according to an embodiment. Query processing module 130 is a subsystem of a database server, such as database server 100A that determines a result of an appropriate query received by query receipt module 120. The operation of query processing module will be discussed in connection with examples in the discussion of FIGS. 3-6. However, it may be noted that query processing module 130 may include subsystems to help take advantage of advanced query handling approaches, as discussed above.

Thus, query processing module 130 may include a query distribution module 132 that causes a query to be distributed over multiple database servers 100A, 100B . . . 100N to be processed. Additionally, query processing module 130 may include a query data partitioning module 134 that partitions a table parameter as it is processed. This partitioning approach is illustrated in FIGS. 4A-B. Furthermore, query processing module 130 may include a query data ordering module 136 that orders a table parameter as it is processed. It may additionally be noted that distribution, partitioning, and order may occur together as part of processing the same query. As a result of these approaches, information from a table parameter used in a TPF may be able to be processed in parallel in some cases.

Figure 1E:
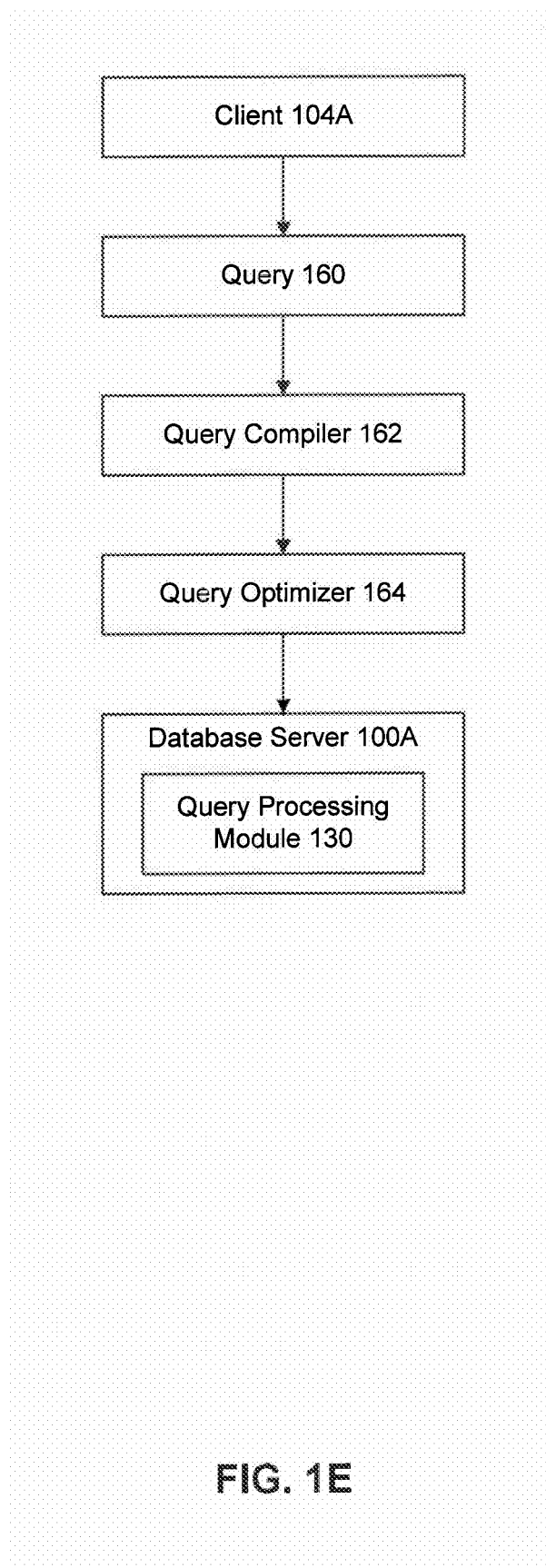
FIG. 1E is a dataflow diagram illustrating interaction between modules that process a query, according to an embodiment.

FIG. 1E is a dataflow diagram illustrating interaction between modules that process a query, according to an embodiment. For example, a query 160 may originate at a client, such as client 104A and be introduced into database servers 100A, 100B . . . 100N that host primary database 108. However, it may be recognized that a variety of approaches will allow introduction of query 160 into primary database 108. For example, a query may be introduced into primary database 108 if it is received at query receipt module 120 of database server 100A from a database administrator (DBA), a user through an interactive query interface, an application programmer through an application, or from a parametric user using a canned transaction.

Once query 160 is received, query compiler 162 turns the query 160 into an internal representation that will allow query processing module 130 to handle the query 160. Optionally, a query optimizer 164 may act on this internal representation to improve performance. For example, query optimizer 164 may rearrange and reorder operations, eliminate redundancies, choose algorithms and indexes, and use the system catalog to improve performance. Further aspects of query optimization are discussed below.

After query compiler 162 and query optimizer 164 have processed query 160, it is passed to query processing module 130 in database server 100A, which carries out processing as discussed in the figures below.

Figure 2:
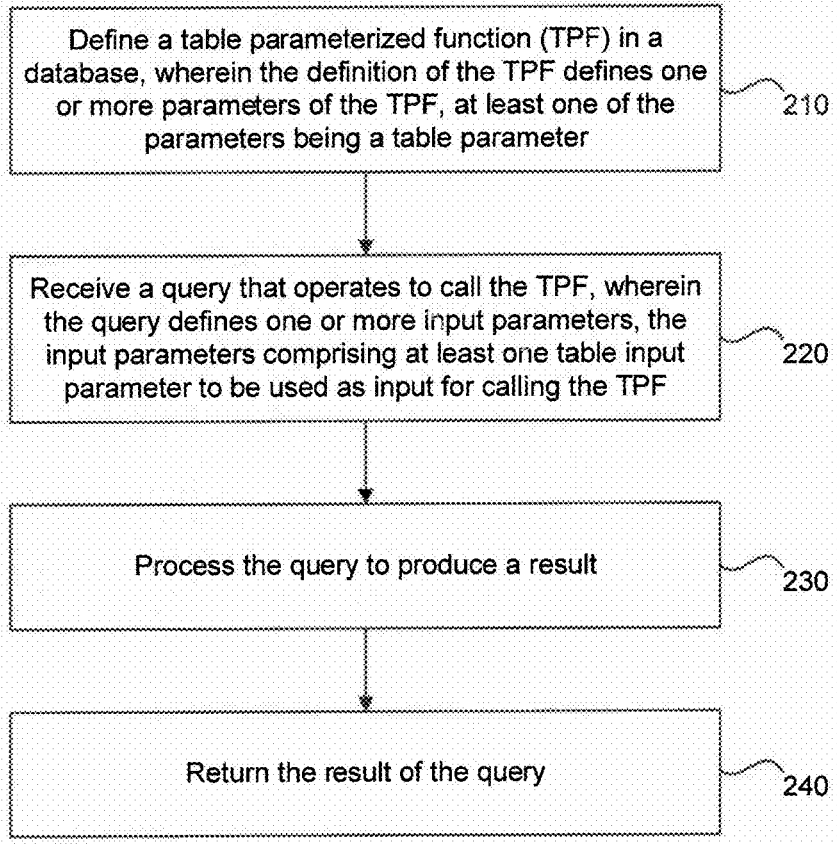
FIG. 2 is a flowchart illustrating an exemplary method for providing table parameterized function (TPF) functionality in a database, according to an embodiment.

FIG. 2 is a flowchart illustrating an exemplary method for providing table parameterized function (TPF) functionality in a database, according to an embodiment. Method 200 is an exemplary operation of system 100 discussed in FIGS. 1A-1E, according to an embodiment.

Method 200 begins with stage 210. In stage 210, an embodiment includes defining a TPF in a database, wherein the definition of the TPF defines one or more parameters of the TPF, at least one of the parameters being a table parameter. For example, stage 210 may be carried out by function definition module 110, such that function definition module 110 receives a definition in a language such as SQL that defines the TPF in primary database 108. The TPF may be defined externally, such as at application programming interface 150 at application server 154, as TPF definition 152A. As discussed, such a TPF definition may comprise C code, C++ code or other native code that specifies how the TPF is to be implemented.

In stage 220, a query is received that operates to call the TPF, wherein the query defines one or more input parameters, the input parameters comprising at least one table input parameter to be used as input for calling the TPF. For example, stage 220 may be carried out by query receipt module 120. As discussed, example sources of the query may include DBAs, users of interactive query interfaces, application programmers, and users of specialized applications. For example, a user of an interactive query interface may enter the query at client 104A through a SQL interactive query prompt as a SELECT query. Examples of this process are discussed below.

In stage 230, the query is processed to produce a result. Query processing module 130 may process the query for database server 100A, or the query processing may be distributed over several database servers 100A, 100B . . . 100N. As discussed, partitioning and ordering may optionally be specified as aspects of the query processing, which may potentially occur in parallel.

In stage 240, the result of the query is returned. For example, result return module 140 may store the results produced in stage 230, or alternatively may output the results to a user.

Figure 3:
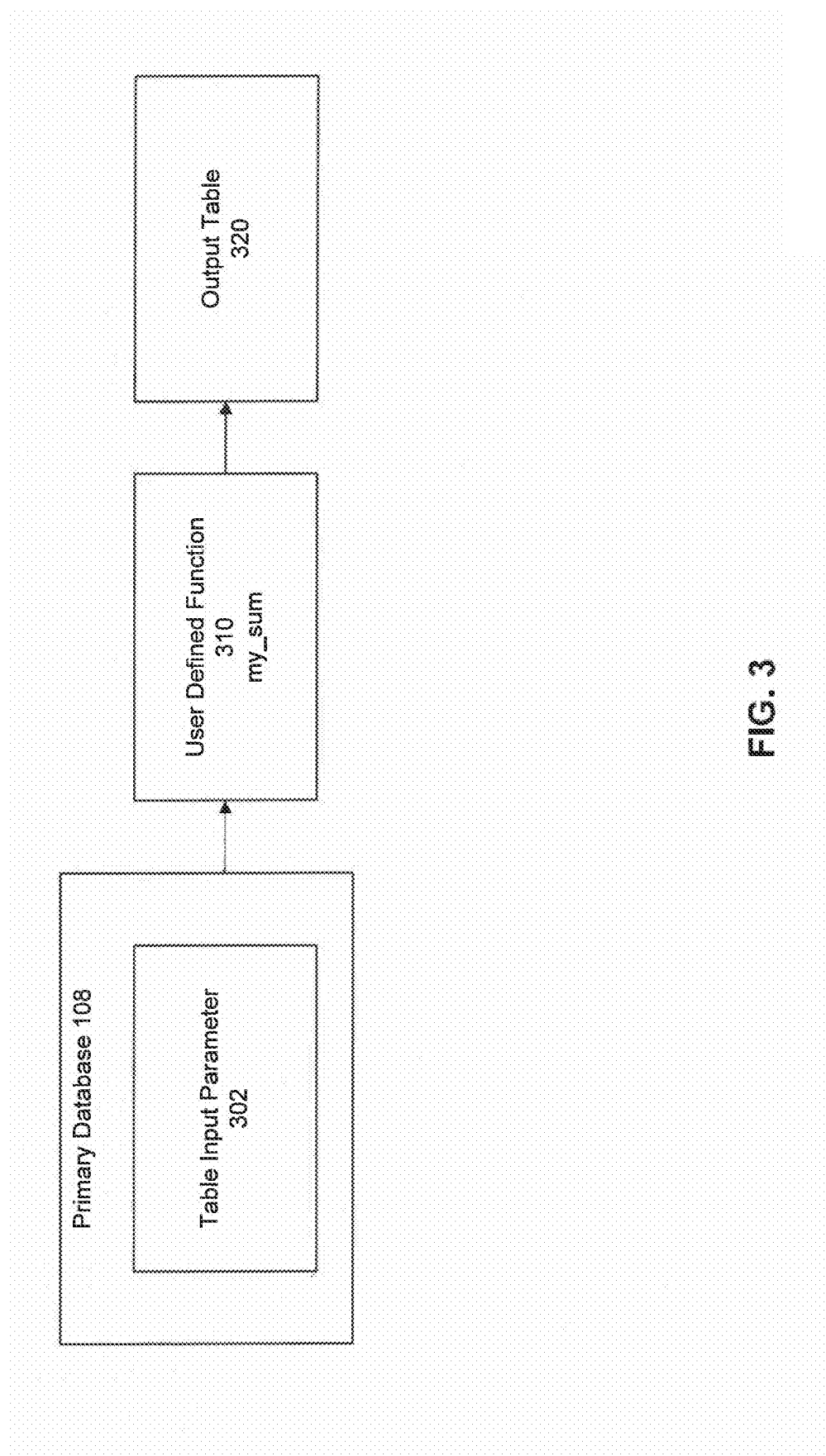
FIG. 3 is a dataflow diagram illustrating how a user defined function that is a TPF operates, according to an embodiment.

FIG. 3 is a dataflow diagram illustrating how a user defined function (UDF) that is also TPF operates, according to an embodiment.

The Table UDF support will enable users to supply external data from outside the server into the database query engine and have the query engine treat the data as if it were a SQL table.

In an embodiment, each of the functions, including but not limited to scalar UDFs, aggregate UDFs and table-valued UDFs, operate on a single input tuple of scalar values and produce either a single scalar value or a set of tuples. The single input model restricts the ability to directly call higher level statistical or analytical APIs that operate over a set of data.

If the server is able to provide a set of tuples for each invocation of a function then integration with set based analytical APIs becomes more convenient. This is the basis for a TPF—e.g., the ability to process a set of data in one function invocation. The function can iterate over the set of input rows and perform its computations without the need to build complex SQL queries.

A table-value parameter is a function parameter that is not a scalar value but instead is a set of rows that are passed to the function. These parameters are similar to a base table in the database where there exists a schema along with a set of rows.

For example, a simple TPF may count the number of rows supplied as a table-valued parameter. A TPF, such as my_sum, is illustrated in the context of FIG. 3.

Overall, FIG. 3 shows that a simple TPF may operate by having primary database 108 that stores table input parameter 302. User defined function 310, my_sum (which is a TPF), may be a user-defined function that accepts a table as a parameter, and returns a count of the number of rows as output table 320.

As an example, a SQL declaration for the TPF may include:
Sample SQL TPF Declaration

```
CREATE PROCEDURE
    my_sum( IN emp_list TABLE( dept_id ) )
    RESULT SET( count INT )
    EXTERNAL NAME 'my_sum_func@my_library'
```

For the most part this procedure definition looks similar to what might be defined for a SQL stored procedure, except that the input parameter "emp_list" is defined as a TABLE instead of the regular expected SQL datatypes.

TABLE is a new object being provided in primary database 108 that identifies a set of rows with an associated schema. In this case "emp_list" is a table with one column of type integer that will be passed to the function. In an embodiment, TPF can have only one input parameter of type TABLE, and the schemas for the TABLE parameter and the result set are required to be defined at procedure creation time. In another embodiment, support may be present for multiple TABLE parameters, and both the input parameters and the result set schemas will be negotiated at the query build time.

In order to execute the above function, my_sum must be referenced in a table expression for a SQL statement and values for each parameter to my_sum must be specified. For example:
Sample SQL TPF Call by Query

```
SELECT my_table.count
    FROM my_sum( TABLE (SELECT dept_id FROM employees))
    AS my_table
```

The above query example illustrates a couple of points worth discussing.

"FROM my_sum":

The ability to reference a UDF as a table expression in the FROM clause is based on the Table UDF support provided in an embodiment.

"my_sum(TABLE(SELECT dept_id FROM departments))":

An embodiment will pass the results of the SELECT query block as the TABLE parameter "emp_list" to the my_sum TPF. In the sample SQL query, the result of the (SELECT dept_id FROM employees) is used as the input TABLE parameter, "emp_list".

Developers will utilize API 150 (such as a native C/C++ API) to retrieve the parameter value, check to ensure that the parameter value is a TABLE datatype and then fetch the individual rows.

"AS my_table":

This is a reference to a table-valued UDF in the FROM clause may be given an alias, in this case "my_table." For a UDF used in the FROM clause, the default correlation name is the function name. In this case "SELECT my_sum.dept_id, my_sum.count" would have been permitted as the select clause if the correlation name "my_table" was not specified.

An alternate query statement using just the table reference instead of a sub-query may include:
Alternative Sample SQL TPF Call by Query

```
SELECT single_table.count
    FROM my_sum(TABLE (employees)) AS single_table
```

The clause TABLE(employees) implies:
TABLE(SELECT * FROM employees)

The schema for input table-valued parameter must match the schema for the input query specification.

The underlying implementation may be represented by the following example pseudo-code:
Sample Pseudo-Code to Count Rows in a Table Parameter

```
void UDF_CALLBACK rg_proc_evaluate(
    a_proc_context *ctx,
        void *args_handle )
{
    a_table              *table     = NULL;
    a_table_context      *rs        = NULL;
    a_value              arg1;
      a_sql_uint64       sum_value;
      a_sql_uint32       c1_data;
      a_column_data      cd[1];
    a_row                r;
    a_row_block          rb;
    cd[0].data           = &c1_data;
    r.row_status         = 0;
    r.column_data        = &cd[0];
    rb.max_rows          = 1;
    rb.row_data          = &r;
    sum_value            = 0;
    ctx->get_value( args_handle, 2, &arg1 );
    if (arg1.type == DT_TABLE) {
        table = (a_table *)arg1.data;
    }
      ctx->open_result_set( ctx, table, &rs );
    while( rs->fetch_into( rs, &rb ) )
    {
        sum += * ( (a_sql_uint32
        *)rb->row_data.column_data->data);
    }
    ctx->close_result_set( ctx, (a_table_context *)rs );
    a_value outvalue;
    outvalue.type = DT_TABLE;
    outvalue.data = CreateTable(sum);
    ctx->set_value( args_handle, 0, &outvalue, 0 );
}
```

The above simple implementation fetches all rows from the input TABLE and produces a count of the rows fetched. The results of the query may include:
Results of Calling TPF

```
single_table.count
==============
1500
```

Row Block Bulk Transfer of Table UDF/TPFs

According to an embodiment, a bulk transfer API allows Table UDFs and TPFs to control an amount of data that gets transferred on each invocation to the UDF. The amount of data includes both data moving from the UDF to a server and data moving from the server to the UDF (input tables in a TPF). Depending on a width of the rows being generated, performance may be better with a larger set of rows being populated on each call to the UDF. In some circumstances with wide rows, the UDF may require fewer rows to be returned per call. This level of UDF developer control is not conventionally available.

Figure 8:
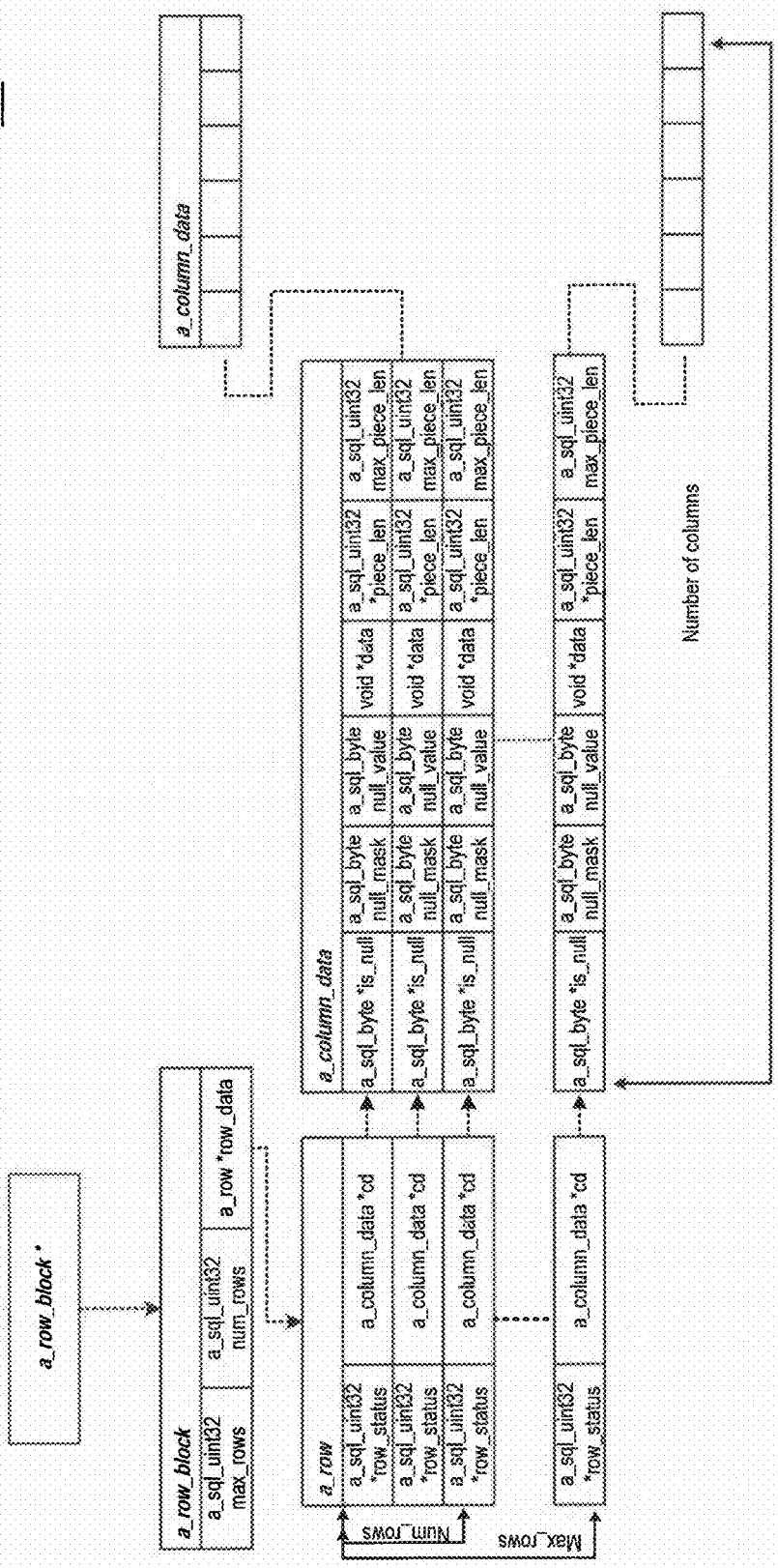
FIG. 8 illustrates an example row block layout, according to an embodiment.

An example row block layout is shown in FIG. 8 as 800.

According to an embodiment, the bulk transfer API provides a UDF developer the ability to use an existing memory layout for storing rows. This reduces data copying because the UDF may point the rowblock structure to existing data in its address space. In some circumstances, a UDF may be predisposed to a certain memory layout for data that will be included in a result set. With other approaches this data would have to be copied into server provided data structures. By using the fetch_block mechanism in the API, UDF developers may use in-memory structures directly to produce data without the need for additional copies. By using the fetch_into mechanism, a UDF may consume data from the server using a memory layout of its choice, and reduce data copies.

The following code example snippets illustrate how a UDF may avoid data copying by pointing to memory in its own address space. In this example, a pre-allocated array of integers is allocated in the UDF's address space. In this example, the UDF owns the row block which means that the UDF is responsible for allocating memory. The first call to fetch allocates a row block structure. During the fetch, no data is copied, and instead, the pre-allocated integers are pointed to directly in the UDF's address space.

```
#define MAX_ROWS 100
struct RowData {
    a_sql_int32      numbers[MAX_ROWS];
    a_sql_uint32     piece_len;
    a_row_block      *rows;
    void Init( )
    {
        rows = NULL;
        piece_len = sizeof( a_sql_int32 );
        for( int i = 0; i < MAX_ROWS; i++ ) {
            numbers[i] = i;
        }
    }
};
```

This example code snippet does not show initialization of RowData. However, as an example, before a first call to udf_rg_fetch_block, RowData may be populated with 100 rows.

```
static short udf_rg_fetch_block(
        a_table_context *tctx,
        a_row_block **rows )
/************************************************/
{
    udf_state *state      = (udf_state*)tctx->user_data;
    RowData* row_data     = (RowData *)tctx->proc_context->_user_data;
    // First build the row block
    if( *rows == NULL ) {
        *rows = BuildRowBlock( tctx->proc_context, 0, MAX_ROWS, false );
        row_data->rows = *rows;
    }
    (*rows)->num_rows = 0;
    while( (*rows)->num_rows < (*rows)->max_rows &&
        state->next_row < state->max_row ) {
        a_row &row = (*rows)->row_data[ (*rows)->num_rows ];
        a_column_data &col0 = row.column_data[ 0 ];
        col0.data = &row_data->numbers[(*rows)->num_rows % MAX_ROWS];
        col0.max_piece_len = sizeof( a_sql_int32 );
        col0.piece_len = &row_data->piece_len;
        state->next_row++;
        (*rows)->num_rows++;
    }
    if( (*rows)->num_rows > 0 ) {
        return 1;
    } else {
        DestroyRowBlock( tctx->proc_context, *rows, 0, false );
        row_data->rows = NULL;
        return 0;
    }
}
```

In this example, the UDF will consume rows from an input table. The UDF will use the fetch_into method meaning that the UDF is responsible for the row block. This will avoid the production of additional copies by a producer when returning the rows.

```
static short tpf_rg_open(
        a_table_context * tctx )
/************************************************/
{
    a_value value;
    tpf_state *state            = NULL;
    a_table_context *rs         = NULL;
    a_sql_uint32 num_to_generate = 0;
    if( !tctx->proc_context->get_value( tctx->args_handle,
                                        1,
                                        &value ) ) {
        return 0;
    }
    if( !tctx->proc_context->open_result_set(
        tctx->proc_context,
                                        ( a_table * )value.data,
                                        &rs ) ) {
        return 0;
    }
    a_sql_uint32    c1_data;
    a_sql_byte      c1_null         = 0x0;
    a_sql_uint32    c1_len          = 0;
    a_sql_byte      null_mask       = 0x1;
    a_sql_byte      null_value      = 0x1;
    a_column_data   cd[1]           =
    {
        {   &c1_null,           // is_null
            null_mask,          // null_mask
            null_value,         // null_value
            &c1_data,           // data
            &c1_len,            // piece_len
            sizeof(c1_data),    // max_piece_len
            NULL                // blob
    }
}
```

```
};
a_sql_uint32        r_status;
a_row               row =
{
    &r_status, &cd[0]
};
a_row_block         rb =
{
    1 , 0 , &row
};
while( rs->fetch_into( rs , &rb ) ) {
    if( !c1_null ) {
        num_to_generate += c1_data;
    }
}
if( !tctx->proc_context->close_result_set( tctx->proc_context,
rs ) ) {
    return 0;
}
state = (tpf_state *)
    tctx->proc_context->alloc( tctx->proc_context,
        sizeof( tpf_state ) );
// Start generating at row zero.
state->next_row = 0;
// Save the value of parameter 1
state->max_row = num_to_generate;
// Save the state on the context
tctx->user_data = state;
return 1;
}
```

Figure 9:
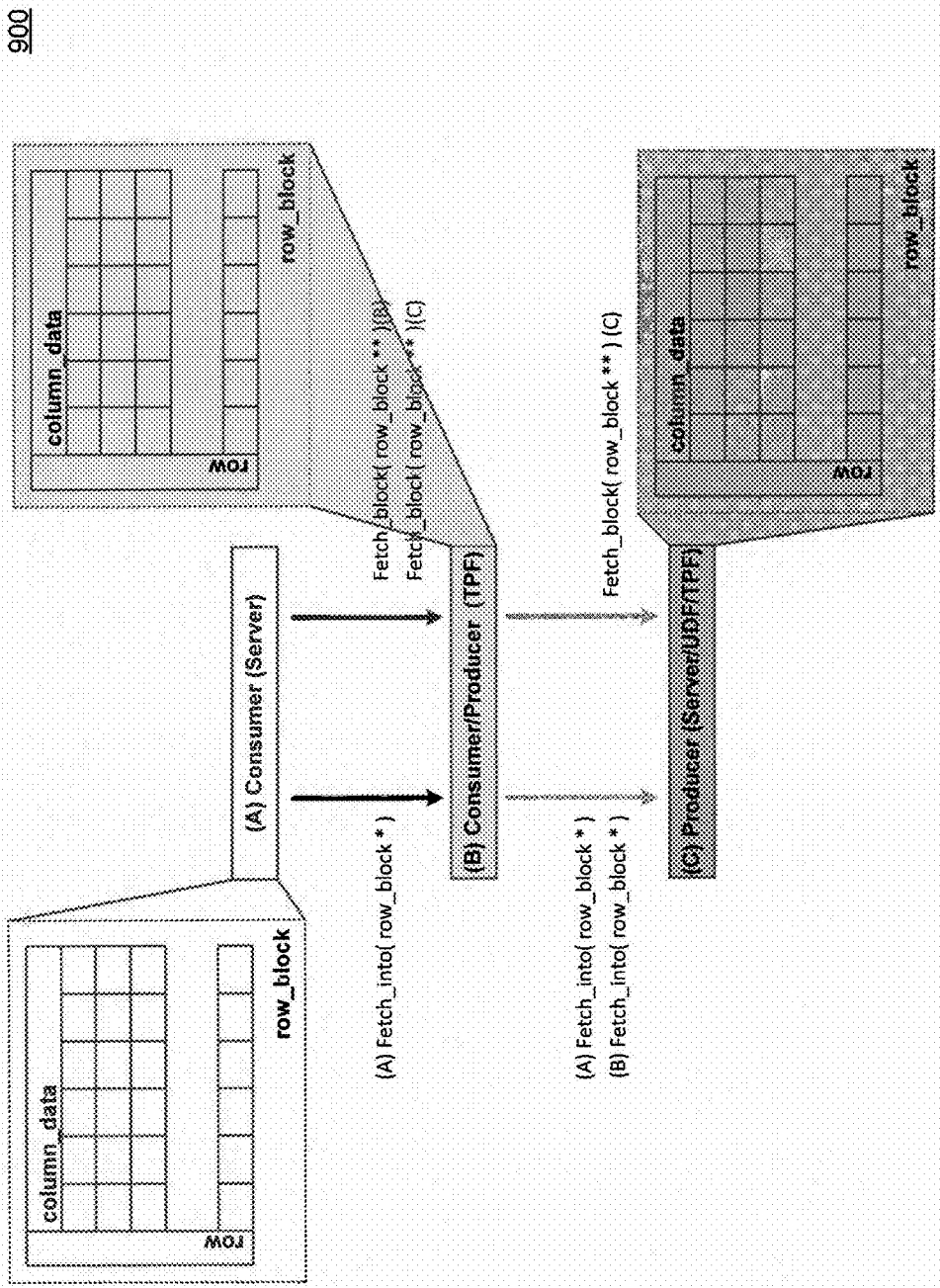
FIG. 9 illustrates row block data exchange, according to an embodiment.

According to example embodiments related to row block data exchange, and as shown in FIG. 9, a row block is a data transfer area between a producer and a consumer. Production by a producer and consumption by a consumer respectively refer to production and consumption of table row data. A producer produces table rows and the consumer consumes table rows. A server may execute scalar and aggregate UDFs once for each matching row of a query. The UDFs consume input scalar parameters and produce, in return a single scalar parameter. However, scalar production and consumption is an inefficient method data exchange if the UDF must produce or consume a table. In general a table UDF is always a producer of data, but a server may not always be the consumer. A table UDF may only produce rows and may use an existing row block or build its own row block.

A TPF may both produce and consume rows. A TPF may produce rows similar to how a table UDF produces rows, i.e. a TPF may use an existing row block or build its own row block. Additionally, a TPF may consume rows from an input table and provide a producer with a row block or request that the producer create its own row block.

Fetch methods for a row block may include fetch_into and fetch_block APIs. When producing data, if a table UDF or TPF builds its own row block, the UDF is to provide the fetch_block API method. However, if the UDF does not build its own row block, the UDF is to provide the fetch_into API method.

When consuming data, if the TPF builds its own row block, the UDF calls the fetch_into method on the producer. However, if the TPF does not build its own row block, the TPF is to call the fetch_block method on the producer.

In an embodiment, the UDF may select which fetch method to use for data production and consumption according to the following guidelines. fetch_into may be used when the consumer owns memory for the data transfer area and requests that the producer use the area. According to this example, the consumer will care about how the data transfer area is set up, and the producer may perform the necessary data copies into the area. fetch_block may be used when the consumer does not care about the format of the data transfer area. fetch_block requests the producer to create a data transfer area and provides a pointer to that area. The consumer owns the memory and the consumer is responsible for copying data from this area.

In an embodiment, the fetch_block method may be used for underlying data storage and is used as an entry point when the consumer does not need data in a particular format. fetch_block is more efficient than fetch_into if the consumer does not require a specific layout. The fetch_block call provides a row block that may be populated and the block is passed on the next fetch_block call. If the underlying data storage does not map easily to the row block structure, the UDF may point the row block to addresses in memory. This may prevent unnecessary data copies. The API uses a data transfer area that is defined by the structure, which is defined as a set of rows, where each row is defined as a set of columns. The row block creator may allocate enough storage to hold a single row or a set of rows. The producer may fill the rows, but may not exceed a maximum number of rows allocated for the row block. If the producer has additional rows, the producer may inform the consumer by returning a numeric indicator from the fetch method. This fetch method is executed against a table object which may be produced as a result of a table UDF or an object consumed as a result set of an input table parameter.

In an embodiment, the fetch_into method may be useful when a producer is not aware of how data should be arranged in memory. The method may be used as an entry point when the consumer has a transfer area with a specific format. fetch_into writes fetched rows into a provided row block. The API uses a data transfer area that is defined by a set of rows, where each row is defined as a set of columns. The creator of a row block may allocate enough storage to hold a single row or a set of rows. The producer may fill the rows but may not exceed a maximum number of rows allocated for the row block. If the producer has additional rows, the producer may inform the consumer by returning a numeric indicator from the fetch method. This fetch method is executed against a table object which may be produced as a result of a table UDF or an object consumed as a result set of an input table parameter. This API allows consumers to optionally construct the row block, such that data pointers refer to its own data structures. The producer may directly populate memory within the consumer. A consumer may not desire to do this if data cleansing or validation checks are required first.

In an embodiment, row block allocation may be required when a producer produces data using the fetch_block method or when the consumer uses the fetch_into method to retrieve data. When allocating a row block, the developer is to determine how many rows the row block is capable of holding, how many columns each row has, and a number of bytes required for each of the columns. For a row block size of m, where each row has n columns, the developer is to allocate an array of in structures. For each row in the array, the developer is to allocate n structures.

In some circumstances it may be desirable for the output from a UDF to be a subset of the input. The bulk transfer mechanism allows the UDF to pass rows from an input into an output without copying any data. This allows for very efficient filtering of data compared to other methods that require copying the data. In these circumstances, a row may be marked as NULL, or not available without having to delete any data. A bit may be set to signify NULL or not available.

The diagram 900 shown in FIG. 9 further illustrates how a row block may be "passed through" to the result set resulting in no data movement.

The following example code snippet illustrates how a UDF may conditionally "pass through" rows from the input to the output based on some type of analysis. For example, specific patterns are sought in the input to determine whether or not to include input in the result set. This fetch method reads rows in from an input table using fetch_into. Instead of allocating a row block structure, the row passed into the UDF's fetch_into method is used. This causes the rows to be passed through from the input to the output. Once the input data is analyzed, rows that are not being included in the result set are marked as unavailable. No deletion is required to remove the row from the result set.

```
static short
tpf_fetch_into( a_table_context *tctx,
                a_row_block    *rb )
/*******************************************************/
{
    short          fetched_row    = 0;
    a_sql_uint64   num            = 0;
    a_blob         *blob          = NULL;
    short          ret            = 0;
    tpf_blob_state *state = ( tpf_blob_state * )tctx->proc_context->_user_data;
    rb->num_rows = 0;
    // Fetch into the same a_row_block "rb" that our caller asked us to
    // fetch into
    fetched_row = state->rs->fetch_into( state->rs, rb );
    if( fetched_row ) {
        a_column_data   *cd    = NULL;
        a_row           *row   = NULL;
        a_sql_uint32    row_status;
        for( a_sql_uint32 i = 0; i < rb->num_rows; i++ ) {
            row = &(rb->row_data[i]);
            cd = row->column_data;
            num = 0;
            if( COL_IS_BLOB(cd, 1) ) {
                ret = state->rs->get_blob( state->rs, &cd[1], &blob );
                if(   state->data_type == DT_VARCHAR ||
                      state->data_type ==DT_LONGVARCHAR ) {
                    num = ProcessBlob( tctx->proc_context, blob,
                        state->pattern );
                } else {
                    char i = (char)atoi( &(state->pattern) );
                    num = ProcessBlob( tctx->proc_context, blob,
                        i );
                }
                ret = blob->release( blob );
            } else {
                if(   state->data_type == DT_VARCHAR ||
                      state->data_type == DT_LONGVARCHAR
                  ) {
                    num = CountNum( (char *)cd[1].data,
                        *(cd[1].piece_len), state->pattern );
                } else {
                    char i = (char)atoi( &(state->pattern) );
                    num = CountNum( (char *)cd[1].data,
                        *(cd[1].piece_len), i );
                }
            }
            // Adjust the status of the shared row block
            if( (num != 0) && (num % 2 == 0) ) {
                row_status = 1;
            } else {
                row_status = 0;
            }
            *(row->row_status) = row_status;
        }
    }
    return fetched_row;
}
```

FIG. 4A is a dataflow diagram illustrating TPF processing that includes partitioning, according to an embodiment. FIG. 4B is a dataflow diagram illustrating additional TPF processing that includes partitioning, according to an embodiment.

In order to enable query parallelism and leverage the distributed query processing capabilities, an embodiment will provide support for data partitioning of the input table-valued parameter on a TPF. In an embodiment, this support will be provided via the PARTITION BY clause that can be specified in the table-expression for the input table parameter.

In an embodiment, the PARTITION BY clause will indicate to the query execution engine how to break up the input into different partitions. As an alternative (discussed in greater depth elsewhere) a CLUSTER BY clause may be used to determine how to break up the input (a CLUSTER BY clause specifies criteria that determine which data goes into which partition). Once the partitions have been identified, the query engine can elect to simultaneously execute in parallel via multiple instances of a TPF, unless the TPF has declared that it cannot run in parallel. This is one example of a TPF extending the functionality of the Table UDFs with scalar parameters.

In an embodiment, the PARTITION BY clause will have 3 forms:

PARTITION BY ANY:
Indicates that query data partitioning module 134 at query processing module 130 of database server 100A can decide how to partition the input table.
NO PARTITION BY:
Indicates that query data partitioning module 134 at query processing module 130 of database server 100A cannot partition the input table. The UDF will consume the entire table in a single execution.
PARTITION BY col-list:
"col-list" is a user specified list of columns that the query data partitioning module 134 at query processing module 130 of database server 100A will utilize to partition the data.

By adding the PARTITION BY clause, database server 100A will ensure the input data set is partitioned and the execution of my_sum is eligible for parallel query processing. If the query processing module 130 decides to go parallel, it will create separate instances of the my_sum as threads and each such instance will consume one partition per invocation.

The following example demonstrates UDF code for declaring partition column lists:
Sample TPF Code Declaring Partitioning Requirements
The following example SQL statement declares my_tpf:

```
CREATE PROCEDURE my_tpf( arg1 TABLE( c1 INT, c2 INT ) )
    EXTERNAL 'my_tpf_proc@mylibrary';
```

In addition, in the following pseudocode, UDF declares that 'c2 and c1' partitioning is required:

```
void my_tpf_proc_describe( a_proc_context *ctx )
{
    if( ctx->current_state == STATE_ANNOTATION ) {
        a_sql_int32 rc = 0;
        a_column_list pbcol =
            {   2,           // 2 columns in the partition by list
                2, 1 };      // column index 2 and 1 require partitioning
        // Describe partitioning for argument 1 (the table)
        rc = ctx->describe_parameter_set(
            ctx, 1,
            DESCRIBE_PARM_TABLE_PARTITIONBY,
```

```
            &pbcol,
            sizeof(pbcol) );
    }
}
```

In the above example, the UDF informs the server that the UDF requires partitioning on column 2 and column 1.

The following example demonstrates UDF code for declaring any partitioning scheme.

Sample TPF Code Declaring any Partitioning Scheme (A) the UDF declares that any column may be used for partitioning.

```
void my_tpf_proc_describe( a_proc_context *ctx )
{
    if( ctx->current_state == STATE_ANNOTATION ) {
        a_sql_int32      rc = 0;
        a_column_list pbcol = { PARTITION_BY_COLUMN_ANY
        };
        // Describe partitioning for argument 1 (the table)
        rc = ctx->describe_parameter_set(
            ctx, 1,
            DESCRIBE_PARM_TABLE_PARTITIONBY,
            &pbcol,
            sizeof(pbcol) );
    }
}
```

In the above example, the UDF informs the server that any partitioning scheme may be used.

The following example includes UDF code indicating that there is no support for partitioning.

Sample TPF Code Declaring No Support for Partitioning (B) The UDF declares that no support partitioning

```
void my_tpf_proc_describe( a_proc_context *ctx )
{
    if( ctx->current_state == STATE_ANNOTATION ) {
        a_sql_int32      rc = 0;
        a_column_list pbcol = {
        PARTITION_BY_COLUMN_NONE };
        // Describe partitioning for argument 1 (the table)
        rc = ctx->describe_parameter_set(
            ctx, 1,
            DESCRIBE_PARM_TABLE_PARTITIONBY,
            &pbcol,
            sizeof(pbcol) );
    }
}
```

In the above example, the UDF informs the server that the UDF does not support partitioning.

Partitioning requirements supplied by the SQL writer must match with partitioning requirements declared by the UDF. If the partitioning requirements declared by the UDF do not match with partitioning requirements declared in the SQL statement, the server will generate an error.

Example: The UDF indicates to the server that the UDF requires the data be partitioned by the first column and the SQL writer also explicitly requests partitioning on a different column. This may conflict with what the UDF is requesting and as a result the server will return a SQL error.

If the SQL writer does not provide partitioning requirements and UDF declares ordering requirements, the server will partition input table data based on UDF declared partitioning requirements.

The following demonstrates invoking my_sum where the input is partitioned on "dept_id."

Sample SQL TPF Call by Query A (with Partitioning)

```
SELECT partition_table.count FROM
    my_sum( TABLE (SELECT dept_id FROM departments)
        OVER (PARTITION BY dept_id) ) AS partition_table
```

Thus, according to example embodiments, the UDF may declare data partitioning requirements and the server may detect conflicts with requirements. For instance, a UDF may programmatically describe partitioning and a column to partition on. The UDF may inquire of a partition to enforce or dynamically adapt to the partitioning. The UDF is to allocate memory, taking into consideration a total number of columns in an input table and sending the data to the server.

In an embodiment, the PARTITION BY clause may be used to express and declare invocation partitioning in a parallel TPF. As a SQL analyst, one may efficiently utilize system resources by leveraging server query parallelism and distribution features available with the PARTITION BY clause in SQL queries. Depending on the clause specified, the server may partition data into distinct value-based sets of rows or by row-range sets of rows.

In an embodiment, value-based partitions may be determined by key values on an expression. The partitions may provide value when a computation depends upon seeing all rows of the same value for aggregation. In addition, row-based partitions provide a simple and effective means to divide a computation into multiple streams of work and may be used when a query must be executed in parallel.

Earlier, the my_sum example computed the sum by processing the entire result set of the input table. By using the PARTITION BY clause, it is possible to compute a set of sums, one for each partition. Partitions may be subsets of rows in a table, so that these partitions may be processed separately. Query processing module 130 is now free to dynamically determine how to execute my_sum in parallel. When this happens, query processing module 130 could elect to instantiate M instances of my_sum that will execute in parallel over N partitions. Generally, M<=N, but in some cases N may be unknown and it may still be possible to choose a value of M that allows parallel processing of the query. The number of partitions are strictly determined by the number of distinct values in the table-valued input parameter. Each invocation of the function my_sum must process exactly one full partition. Query processing module 130 is then responsible for combining the output result-sets from the N invocations of the function into a single table, one row for each partition. Query distribution module 132 and query data partitioning module 134 may potentially facilitate this process.

The results of the above query could be (where query data partitioning module 134 partitions and processes using 3 separate invocation instances)

| partition_table.count |
|---|
| 800 |
| 500 |
| 200 |

The three (3) individual values represent the output from executing my_sum on the three (3) partitions of data. If the total overall sum must be computed, in an embodiment, the query can be rewritten to call my_sum one more time with the input from the above result set.

Sample SQL TPF Call by Query B (with Partitioning)

```
SELECT total_table.count
    FROM my_sum( TABLE (SELECT partition_table.count
        FROM my_sum(
        TABLE(SELECT dept_id FROM departments )
            OVER (PARTITION BY dept_id)
        ) AS partition_table
    )) AS total_table
```

The outermost reference to my_sum does not contain a PARTITION BY clause and as our first example, will operate over the entire table "total_table" which contains the partial counts {(800), (500), (200)}. The final result would be:

```
total_table.count
=================
      1500
```

FIGS. 4A-B illustrate how the TPF processing occurs when partitions are specified in the query. In an embodiment, using the table input parameter 402, primary database 108 is divided into three partitions 402A, 402B, and 402C based on the number of distinct values in the table-valued input parameter. Partition 402A is processed by UDF instance 404A of my_sum to yield instance output 406A. Partition 404B is processed by UDF instance 404B of my_sum to yield instance output 406B. Partition 402C is processed by UDF instance 404C of my_sum to yield instance output 406C. If the UDF counts rows in a table parameter, the instance outputs 406A, 406B, and 406C will provide counts of the rows in each partition. FIG. 4B illustrates how these results may be combined. For example, instance outputs 406A, 406B, and 406C may be provided as inputs to another UDF instance 404D of my_sum. This will combine the results to provide a total overall count.

FIG. 5 is a flowchart illustrating TPF processing that includes ordering, according to an embodiment.

In addition to partitioning and clustering, primary database 108 will also support the capability of ordering of data provided as input for a table-valued parameter. The order of the data does not depend on a partition by or cluster by specification. Ordered data is very important to predictive or forecasting analytical functions. This support will be provided via the ORDER BY clause that can be specified in the table-expression for the input table parameter.

Sample UDF Code for Declaring Ordering Requirements

The following example code snippet defines ordering requirements for column 1 and column 2 of the input table parameter:

```
a_orderby_list  *obl = (a_orderby_list *)ctx->alloc(
                    ctx,
                    buffer_size );
obl->number_of_elements = 2;
obl->order_elements[0].column_index = 1;
obl->order_elements[0].ascending = 0;
obl->order_elements[1].column_index = 2;
obl->order_elements[1].ascending = 1;
desc_rc = ctx->describe_parameter_set( ctx,
    1,
    DESCRIBE_PARM_TABLE_ORDERBY,
    obl,
    buffer_size );
```

Sample SQL for Declaring Ordering Requirements for the Input Table Parameter

The following SQL statement executes my_tpf_func with the input being ordered by input column 1 and 2.

```
select * from my_tpf_func( 1, 1, TABLE( select tca, tcb from table1 )
over ( order by 1,2 ) )
```

The ordering requirement supplied by the SQL writer must match with the ordering requirements declared by the UDF. If the ordering requirements declared by the UDF do not match with the ordering requirements declared in the SQL statement, the server will generate an error.

Example: The UDF describes to the server that the UDF requires the data be ordered by the first column and the SQL writer also explicitly requests ordering on a different column. This SQL writer request conflicts with what the UDF is requesting and as a result the server will return a SQL error.

If the SQL writer does not provide ordering requirements and UDF declares ordering requirements, the server will order input table data based on UDF declared ordering requirements.

Thus, according to example embodiments, the UDF may declare data ordering requirements and a server may detect conflicts with ordering requirements. An ORDER BY attribute indicates the order of rows in a table. If the UDF sets the ORDER BY attribute on the input table parameter, the server will guarantee data ordering for the input data. In this scenario, the UDF will describe to the server that that the input data must be ordered. If the server detects a runtime conflict, the server will raise a SQL exception. As an example, if the UDF indicates that the first column of the input table parameter is to be in ascending order and the SQL statement includes a descending clause, the server raises a SQL exception. If the SQL statement does not include an ordering clause, the server will automatically add ordering to ensure that input table parameter is ordered as required.

When the ORDER BY clause is not present, the query engine is free to supply the rows in whatever fashion is most efficient. In addition, subsequent invocations of the UDF may or may not deliver the data values in the same relative order as previous invocations.

When combined with the PARTITION BY or CLUSTER BY clause(s), rows from within the partition or cluster will be ordered by the specified order expression list. The query engine is also free to determine how to best sort the data if it is not already sorted.

As an example, the following is a price prediction function:

```
CREATE PROCEDURE predict_next_value(
    IN stock_values TABLE(
        stock_name CHAR(40),
        stock_date DATE,
        stock_value DOUBLE ) )
    RESULT TABLE(
        stock_name CHAR(40),
        stock_future_price DOUBLE )
    EXTERNAL NAME 'next_value_func@my_library'
```

For example, the following query may be used to execute the above on a fact table containing closing price and ticker symbol name columns and to predict the next stock closing value for each ticker symbol name.

```
SELECT my_table.stock_name, my_table.stock_future_price
   FROM predict_next_value(
      TABLE(SELECT stock_name,date,stock_price FROM
      departments )
         OVER(PARTITION BY stock_name
         ORDER BY date ASC )
   )) AS my_table
```

At runtime, the query engine will partition the data by the "stock name" and then determine how to concurrently execute "predict_next_value( )". As an example, data may include only three (3) stock names {ORCL, TDC, SY} (these are arbitrary stock names, used as an example) and closing prices for each of the stocks. The execution would partition the data into sets of three prices, each set corresponding to one of the stock names, such that each partition is ordered by date. Given this context, the prediction UDF could predict the next stock value for each stock as a result and perform the calculations in parallel.

However, ordering may occur by itself when a PARTITION BY clause is not specified. Such an approach is illustrated in FIG. 5. Primary database 108 stores a table input parameter 502. Table input parameter 502 is passed to query data ordering module 136 that provides an ordered table input parameter 510 to UDF 520. For example, UDF 520 may be a predictive UDF, predict_next_value. UDF 520 uses the ordered table input parameter 510 to generate output table 530. The advantage of ordering is that certain data, when ordered, reveal trends in the data. A UDF that uses ordered data may thus generate a predictive output, as discussed.

Figure 6:
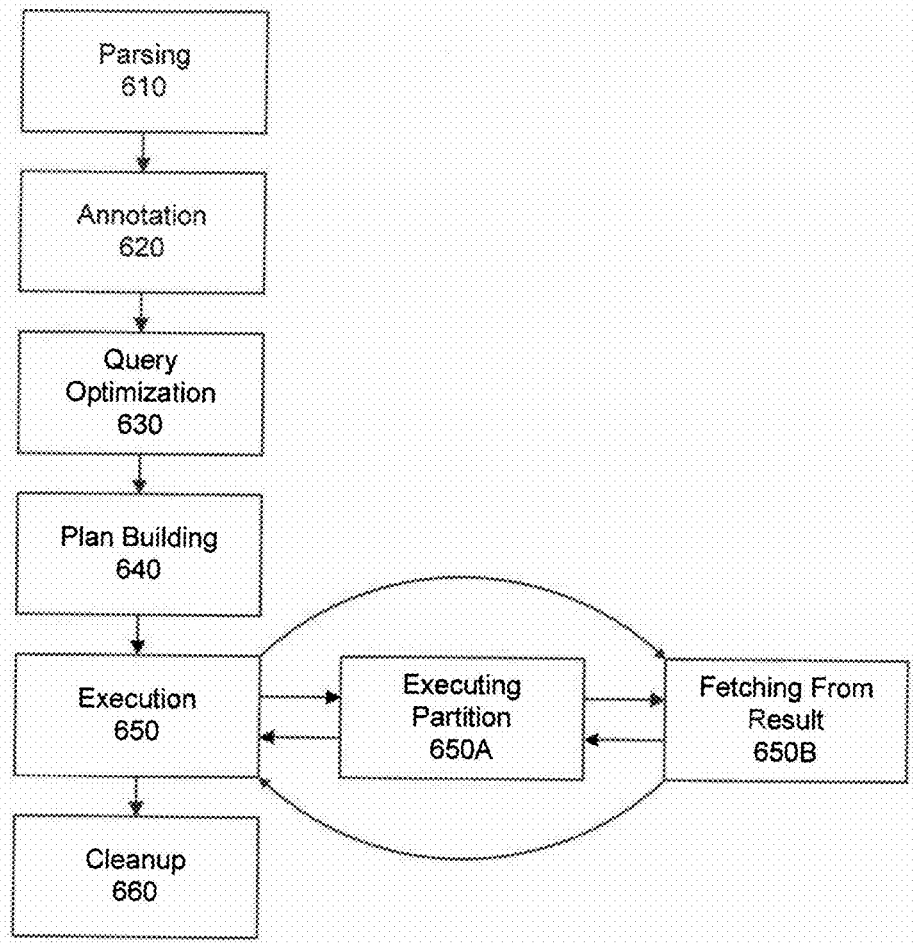
FIG. 6 is a flowchart illustrating stages in processing a query, according to an embodiment.

FIG. 6 is a flowchart illustrating stages in processing a query, according to an embodiment. Method 600 is an exemplary operation of query processing module discussed in FIG. 1B, according to an embodiment. In general, method 600 is carried out by various subsystems of database server 100A, especially query processing module 130. Method 600 is presented in a manner that pertains to processing any UDF, including a UDF that is not necessarily a TPF, but method 600 is relevant if the UDF is also a TPF (i.e., the UDF is a user defined function where at least one of the parameters is a table parameter).

Method 600 begins with parsing in stage 610. This is an internal stage carried out by database server 100A. In this stage, a SQL query is parsed into an internal representation called a parse tree.

Stage 620 includes annotation. By the time annotation occurs, the SQL has been transformed into a parse tree. At stage 620, database server 100A updates the parse tree with UDF metadata which includes necessary information to support efficient and correct query optimization. UDF schema negotiation occurs during this state, if required. UDF schema negotiation ensures that the parameters provided are of the type that is called for.

If the schema for the UDF is declared then the UDF is not loaded or used during this phase. However, an embodiment may be polymorphic and/or self-described. If this is the case, then database server 100A will load the UDF and request that the UDF describe its output result TABLE and/or its input parameters. This stage 620 also permits the UDF to describe the schema for any input TABLE parameters and the types for any scalar arguments.

Database server 100A will provide the correct number and names of the input parameters. UDFs are also expected to provide the same information to the server at this point. Data types are set for some columns and parameters, otherwise a default null value may be used.

In this stage, the UDF can only obtain values for constant literal parameters if any exists. All other values will not be available until later on in the execution phase and the get_value( ) API will return a failure.

Stage 630 includes query optimization. In this stage, query optimizer 164 optimizes the annotated parse tree for the SQL statement. Via a negotiation process, database server 100A and the UDF communicate what partitioning and/or ordering/clustering is already specified, in the query for input table, and what partitioning and/or ordering for an input table is appropriate. The UDF may declare, at create time, physical properties (e.g., an ordering property) for the result table. The partitioning, ordering and clustering may be specified by clauses in the SQL query. The UDF may supply other information to database server 100A. Optimization may also allow the UDF to describe properties and statistics that can be used to enhance and estimate query performance. For example, estimates may be available for query execution time, query memory use, table size of table input parameter, table size of results, and column scope (for input and output columns).

Stage 640 includes plan building. In this stage, database server 100A builds a query execution plan based on the query optimization from stage 630. Database server 100A determines which columns are needed from the UDF and asks the UDF to help determine which columns are needed from a table parameter. This plan can be stored and used to repeat the query for subsequent executions. Constant scalar parameters may be cached, and queries that involve parallelism may cause multiple instances of the UDF to be created.

Stage 650 includes execution. In this stage, database server 100A calls the UDF. Scalar values will be available, and table parameters will have rows available for fetching. Partitioning will occur appropriately, such that if partitioning is supposed to occur, the UDF will work on each of the partitions separately by carrying out executing partition 650A. Otherwise, stage 650 will call fetching from result 650B. Fetching from result 650B is not a state available to the UDF, instead it is used to retrieve rows for use in execution 650.

Stage 660 includes cleanup, which is an internal stage that is invisible to the UDF.

Parameters for TPFs

Embodiments support the co-existence of both scalar and table valued parameters when calling and defining a TPF function. No specific ordering is required among the scalar and table parameters.

As discussed, a native C/C++ API may be provided for working with parameters. For example, such an API may provide two primary methods for working with values, including:

API Value Access Methods

```
short (*get_value)(
    void            *arg_handle,
    a_sql_uint32    arg_num,
    value           *value
    );
short (*set_value)(
    void            *arg_handle,
    a_sql_uint32    arg_num,
    a_value         *value,
    short           append
    );
```

An example of calling get_value( ) includes:
Example get_value( ) call:

```
void rg_proc_describe(
    a_proc_context *ctx,
    void *args_handle )
{
a_value arg1;
ctx->get_value( args_handle, 1, &arg1 );
    if (arg1.type == DT_INT) {
        num_of_rows = *(int *)arg1.data;
    }
}
```

Subset Pass Through

UDFs can map input table columns to output table columns in order to preserve column metadata that the server can later use for either query optimization or runtime execution performance. The TPF guarantees to the consumer that data will not be altered. The consumer can utilize characteristics from the originating column. The TPF may not produce additional datums, but might virtually remove datums by setting a status flag to "not exist". This facilitates low data movement and improves performance.

Consider the following schema:

Schema A

```
create table table1 ( tca int, tcb int )
insert into table1 values (1,150)
insert into table1 values (2,140)
insert into table1 values (3,130)
insert into table1 values (4,120)
insert into table1 values (4,110)
commit
create procedure tpf_pt_func( in pa_table table( ptca int, ptcb int, ptcc int ) )
    results ( ra int, rb int, rc int )
    select * from tpf_pt_func( table( select tca, tcb, tcb from table1 ) )
```

The following pseudocode could be used by the TPF to inform the server that column 1 of the input maps to column 1 of the output table.

```
void tpf_pt_proc_describe( a_proc_context *ctx )
/*****************************************************
********/
{
    a_col_subset_of_input desc_map_in_to_out = { 1, i };
    desc_rc = ctx->describe_column_set( ctx,
        0, 1,
        DESCRIBE_COL_VALUES_SUBSET_OF_INPUT,
        &desc_map_in_to_out, sizeof(a_col_subset_of_input) );
    return;
}
```

Reduced Data Production

Producer UDF can programmatically identify a list of output table columns which are not going to be consumed. The subset could be identified by the SQL query or programmatically by the UDF.

For an output table parameter, the UDF normally produces the data for all the columns, and the server consumes all the columns. The same holds true for the input table parameter where the server normally produces the data for all the columns, and the UDF consumes all the columns.

In some cases the consumer/server or the UDF may not consume all the columns. Alternatively, the producer can query the usage of individual columns through the describe_column_get API and then use the second attribute listed above.

The following pseudocode fragment could be used to identify unused columns on a table.

```
if( ctx->current_state == STATE_EXECUTING ) {
    a_sql_int32    rc;
    a_sql_uint32   buffer_size = 0;
    buffer_size = sizeof(a_column_list)
        + ( mytable->number_of_columns - 1 )
        * sizeof(a_sql_uint32);
    a_column_list *ulist = (a_column_list *)ctx->alloc(
        ctx,
        buffer_size );
    memset(ulist, 0, buffer_size);
    rc = ctx->describe_parameter_get( ctx,
        0,
        DESCRIBE_PARM_TABLE_UNUSED_COLUMNS,
        ulist,
        buffer_size );
    rgTable->unused_col_list = ulist;
}
```

Preservation of Input Ordering

When data is requested to be ordered, typically through the use of the 'ORDER BY' SQL clause, the server will add a data flow order operator. If the server can determine that the data flow is already ordered in the same fashion as being requested by the 'ORDER BY' SQL clause, then the server can optimize the 'ORDER BY' by removing the clause. The API provides a means at runtime by which the UDF can programmatically declare the output ordering to the server/consumer. The server can then apply order optimizations to the query plan.

The producer can also identify the ascending or descending nature of the order as well.

The following pseudocode illustrates how a producer can programmatically declare data ordering:

```
buffer_size = sizeof( a_orderby_list ) +
    (1 * sizeof( a_order_el ));
a_orderby_list    *obl = (a_orderby_list *)ctx->alloc(
    ctx,
    buffer_size );
obl->number_of_elements = 2;
obl->order_elements[0].column_index = 1 );
obl->order_elements[0].ascending = 1;
obl->order_elements[1].column_index = 2;
obl->order_elements[1].ascending = 0;
desc_rc = ctx->describe_parameter_set( ctx,
    0,
    DESCRIBE_PARM_TABLE_ORDERBY,
    obl,
    buffer_size );
ctx->free( ctx, obl );
}
```

Rewinding Input or Output Table Data

When data is processed by a consumer, there might be a point in which the data requires a second pass. From within the same function invocation, the UDF can rewind the input table and start fetching from the start. If a UDF algorithm is expected to rewind, the UDF algorithm first notifies the server that rewind may occur and the server will then optimize execution to support rewind.

The following pseudocode illustrates how a UDF can notify the server (consumer) that it is expected to rewind:

```
rewind_tpf_describe(a_proc_context *cntxt)
/*****************************************************/
{
```

```
    a_sql_byte        rewind_required = 1;
    // Inform the consumer that input table 1 may need to be rewound.
    cntxt->describe_parameter_set( cntxt,
        1,
        DESCRIBE_PARM_TABLE_REQUEST_REWIND,
        &rewind_required,
        sizeof( a_sql_byte ) );
}
```

In addition to supporting input table data rewind, a UDF as a producer can provide rewind support for its output results. By default, the producer may set itself up such that it will only produce output data once. This is conducive to performance efficiencies or by a result of an algorithm limitation whereby previously generated data is either not available or available at a cost.

The following pseudocode illustrates how a UDF might notify a corresponding consumer that the UDF supports rewind:

```
rewindable_udf_describe(a_proc_context *cntxt)
/****************************************************/
{
    a_sql_byte        rewind_supported = 1;
    // Inform the consumer that we support rewind natively.
    cntxt->describe_parameter_set( cntxt,
        0,
        DESCRIBE_PARM_TABLE_HAS_REWIND,
        &rewind_supported,
        sizeof( a_sql_byte ) );
}
```

In addition to describing the rewind capabilities, the UDF has an API to initiate a rewind process which is illustrated in the following example pseudocode where the "rs->rewind (rs)" call is made:

```
for( int i = 0; i < num_to_rewind; i++ ) {
    while( rs->fetch_into( rs, &rb ) ) {
        return_value += *(int *)c1Ptr;
    }
    // Rewind the table and repeat.
    if( i + 1 < num_to_rewind ) {
        rs->rewind( rs );
    }
}
```

SQL Language Specifics
Declaring Table Parameterized Functions (TPFs)

This section describes the general CREATE PROCEDURE SQL statement for table-valued UDFs with table-valued parameters.

The following terminology is used in this section:
TABLE data type:

An object having the TABLE data type can be used to store the result set of a SQL statement. A TABLE object has a defined schema where each column has a SQL data type. Columns cannot be of type TABLE. A TABLE data type can be used for input parameters of UDFs, the result set of table-valued UDFs, or for objects instantiated as SQL variables. The CREATE PROCEDURE SQL statement and the SQL statements referencing UDFs use, for both table-valued parameters and the table-valued result sets, the TABLE construct. The TABLE construct is similar to "ROW( ) MULTISET" construct defined by the ANSI SQL standard, and it will be used in the following form: TABLE (column-name column-type, . . . ).

Table-valued parameter:

A parameter of type TABLE used for UDFs accepting table-valued parameters. The schema of a TABLE parameter may or may not be defined at the CREATE PROCEDURE time. If the schema of a TABLE parameter is not defined at the CREATE PROCEDURE time, the UDF is polymorphic and the schemas of such parameters are negotiated at query build time when the UDF is used in a SQL statement.

Scalar parameter: any expression of SQL datatype
External TPFs

This section describes the general SQL syntax for declaring external UDFs accepting table-valued parameters. The following properties are to be supported for this type of external UDFs:

A) They are external UDFs implemented in a language other than SQL.

B) They are table-valued UDFs, i.e., they return a set of rows.

C) They accept a mixed input set of table-valued parameters and scalar parameters.

D) They are polymorphic, i.e., the parameters and their schemas and/or the schema of the result set are not defined at the CREATE PROCEDURE statement.

E) They are self-describing, i.e., the parameters and their schemas and/or the schema of the result set are dynamically determined at query build time via a negotiation process using the defined API.

F) They can be referenced in any SQL statement, in a FROM clause, or directly in a CALL statement.

G) They are deterministic functions, namely a UDF is expected to return the same result set for the same set of input parameters for the duration of the SQL statement they are referenced in the FROM clause.

An example SQL statement for declaring this type of UDF is as follows:

```
CREATE [ OR REPLACE ] PROCEDURE [owner.]procedure-name(
   [ parameter, ... ])
   [ RESULT [SET] [TABLE] (column-name data-type, ... )
   | RESULT [SET] TABLE
   | NO RESULT SET
   [ SQL SECURITY { INVOKER | DEFINER } ]
   EXTERNAL NAME 'external-call'
parameter:
   [IN|OUT|INOUT] parameter-name data-type [DEFAULT expression ]
   | [IN|OUT] parameter-name table-type
table-type:
   TABLE ( column-name data-type, ...)
   | TABLE
external-call :
   [operating-system:]function-name@library; ...
```

The CREATE PROCEDURE SQL statement allows the creation of a permanent external table-valued UDF which is implemented in a different language than SQL. External UDFs cannot be declared using TEMPORARY clause.
  parameter-name
  procedure_name
  column_name Procedure names, parameter names, and column names must conform to the rules for other database identifiers defined for primary database 108.
  data-type The data type for a scalar parameter, a result column, and a column of a TABLE parameter must be a valid SQL data type.
  parameter-mode: IN|OUT|INOUT Parameters can be qualified with parameter mode keyword. IN, OUT, or INOUT. If one of these values is not specified the default is IN.

IN

The parameter is an object that provides a value for a scalar parameter or a set of values for a TABLE parameter to the UDF.

OUT

The scalar parameter must be a variable that could be given a value by the UDF. TABLE parameters can be declared OUT but not INOUT. A TABLE parameter declared OUT is another result set returned by the UDF.

INOUT

The scalar parameter is a variable that provides a value to the UDF and could be given a new value by the UDF. TABLE parameters cannot be declared INOUT.

table-type

TPFs will support any number of scalar parameters and any number of TABLE parameters. A TABLE parameter defines a schema for an input set of rows to be processed by the UDF. The definition of a TABLE parameter includes column names and column data types. For example:

TABLE(c1 INT, c2 CHAR(20)) defines a schema with the two columns c1 and c2 of types INT and CHAR(20), respectively. Each row processed by the UDF must be a tuple with two (2) values. Table parameters, unlike scalar parameters, cannot be assigned a default value.

If a TABLE parameter does not include the definition of its schema in the CREATE PROCEDURE, the UDF must be able to dynamically negotiate the schema of these parameters at the runtime of the SQL statement referencing this UDF. In other words, the UDF has a polymorphic behavior and it is self-describing.

NO RESULT SET clause

NO RESULT SET clause specifies that the UDF does not return a result set. A TPF declared with NO RESULT SET cannot be used in the FROM clause of a SQL statement. It can only be used in a CALL statement.

RESULT clause

The RESULT clause declares the column names and their data types for the result set of the external UDF. The data types of the columns must be a valid SQL datatype (e.g., a column in the result set cannot have TABLE as data type). External UDFs can only have one result set of type TABLE. If the RESULT clause does not include the schema of the result set, the UDF is polymorphic and must negotiate the schema of the result set at the query build time of the SQL statement referencing the UDF.

SQL SECURITY clause

The SQL SECURITY clause defines whether the UDF is executed as the INVOKER (the user who is calling the UDF), or as the DEFINER (the user who owns the UDF). The default is DEFINER.

EXTERNAL NAME clause
EXTERNAL NAME 'external-call'
external-call:
    [operating-system:]function-name@library; . . .

An external UDF must have an EXTERNAL NAME clause that defines an interface to a function written in a programming language such as C. The function is loaded by the database server into its address space.

The library name can include the file extension, which is typically .dll on Windows and .so on Unix. In the absence of the extension, the software appends the platform-specific default file extension for libraries.

The following is a formal example.

```
CREATE PROCEDURE mystring(IN instr VARCHAR,
    IN input_table TABLE( A INT ) )
    RESULT SET TABLE
    EXTERNAL NAME 'mystring@mylib.dll;
    Unix:mystring@mylib.so'
```

A simpler way to write the above EXTERNAL NAME clause, using platform-specific defaults, is as follows:

```
CREATE PROCEDURE mystring(IN instr VARCHAR,
    IN input_table TABLE( A INT ) )
    RESULT SET TABLE
    EXTERNAL NAME 'mystring@mylib'
```

Permissions

The CREATE PROCEDURE statement declares an external UDF in the database. Users with DBA authority can create UDFs for other users by specifying an owner. Users must have DBA authority to create an external UDF or to create an external UDF for another user.

In one embodiment, the following features are supported:

A) TABLE data type will be supported for TPFs to describe TABLE parameters and the result set, i.e., variables will not be allowed to be of type TABLE.

B) The external TPFs are implemented in C/C++.

C) An external TPF will be allowed to contain a mix of scalar and at most one TABLE parameter.

D) TABLE parameters can only be specified as IN parameters.

E) TABLE parameters must be specified at CREATE PROCEDURE time, i.e., they cannot be polymorphic.

F) The schema for the result set of table TPFs must be specified at CREATE PROCEDURE time, i.e., the TPF cannot be polymorphic.

G) A TPF does not have to be self-describing as it cannot be polymorphic.

H) The external TPF cannot be referenced in a CALL SQL statement.

With the above restrictions, the CREATE PROCEDURE SQL statement supported for this embodiment is as follows:

```
CREATE [ OR REPLACE ] PROCEDURE [ owner.]procedure-name
    ( [ parameter-list, ... ] )
    RESULT [SET] [TABLE] (column-namedata-type, ... )
    [ SQL SECURITY { INVOKER | DEFINER } ]
    EXTERNAL NAME 'external-call'
parameter-list :
    [IN|OUT|INOUT] parameter-namedata-type [ DEFAULTexpression ]
    | [IN] parameter-name table-type
table-type:
    TABLE ( column-name data-type, ...)
external-call :
    [operating-system:]function-name@library; ...
```

In another embodiment, the following features are supported:

A) TABLE parameters may or may not be specified at CREATE PROCEDURE time, i.e., the TPF can be polymorphic. Moreover, the schemas for the input parameters are dynamically negotiated between the server and the TPF at query build time, i.e., the TPF is self-describing.

B) The result set of the TPF may or may not be specified at CREATE PROCEDURE time, i.e., the TPF can be polymorphic. Moreover, the schema for the result set is dynamically negotiated between the server and the TPF at query build time, i.e., the TPF is self-describing.

With the above restrictions, the CREATE PROCEDURE SQL statement supported for this embodiment is as follows:

```
CREATE [ OR REPLACE ] PROCEDURE [ owner.]procedure-name
( [ parameter-list, ... ] )
{ RESULT [SET] [TABLE] (column-namedata-type, ... )
    | RESULT [SET] TABLE}
[ SQL SECURITY { INVOKER | DEFINER } ]
EXTERNAL NAME 'external-call'
parameter-list :
    [IN|OUT|INOUT] parameter-namedata-type [ DEFAULTexpression ]
    | [IN] parameter-name table-type
table-type:
    TABLE ( column-name data-type, ...)
    | TABLE
external-call :
    [operating-system:]function-name@library; ...
```

The following features may be considered for further embodiments:

A) TABLE parameters may be specified as OUT in addition to IN. This feature will allow a TPF to return multiple result sets.

B) A TPF may accept multiple TABLE parameters.

C) The list of parameters may be dynamically negotiated, i.e., the TPF could be polymorphic not only with respect to schemas but also the number and name of parameters.

EXAMPLES AND USE CASES

Example 1: MapReduce

The MapReduce paradigm is a use case where developers can build map and reduce functions and that can be executed in parallel from within the database servers. With the Table UDF functions a customer could write the following:

```
SELECT map.key, sum( map.value ), ...
    FROM my_table A, LATERAL ( my_map( A.x, A.y, ... ) ) map
    GROUP BY map.key
```

This approach will work for Table UDF function, however using a Table UDF imposes the following limitations:

A) One must declare the following at procedure create time:
  a. Input schema: (c1 int, c2 int, . . . )
  b. Result set schema: (key int, value int, . . . )
  c. Tuple input to each invocation as opposed to set B) It is too rigid for a generalized "write once" framework C) There is a limited opportunity for distributed "map" functions, designed to "Apply all" over list D) There is limited user control over parallelizability/distribution In one embodiment, a TPF-based solution would remove the tuple input for each invocation and significantly improve the end user and developer control over parallelization and distribution.

In another embodiment, additional enhancements may be made to remove the fixed schema limitation and provide truly dynamic self-describing and polymorphic functions. In such an embodiment, MR implementation of a TPF function might look like the following:

```
CREATE PROCEDURE my_map( DYNAMIC )
    RESULT SET (TABLE (DYNAMIC) )
    EXTERNAL NAME "my_map@my_dll"
    LANGUAGE C
```

Using a SELECT statement the map reduce job (using GROUP BY for reduce) becomes:

```
SELECT map.key, sum( map.value ),
    FROM my_map( TABLE ( select * from my_table) as A
        OVER(PARTITION BY A.x ORDER BY A.y,2) )
    GROUP BY map.key
```

Example 2: Advanced Set Based Processing

With the ability to perform set-to-set analytics, developers can now build TPF that could perform the following.

A) Row Augmentation: Given an input set of rows, filter rows out by a computation and project a reduced set of rows via some filtering algorithm or project an increased set of rows via some interpolation algorithm.

For example, it may be possible to replace the built in LIST( ) function.

B) Row Tracing: Build a TPF that can trace data flowing through the query engine.

C) Column Augmentation: Similar to row augmentation except at a column level.

For example, it may be possible to replace the built in NUMBER(x) function.

Example 3: Advanced Statistical Interpolation

A recalendaring function may receive a set of input timeseries data where there are missing values. A TPF-based solution offers a recalendaring function that is able to interpolate and fill in the missing values.

Example Computer Embodiment

Figure 7:
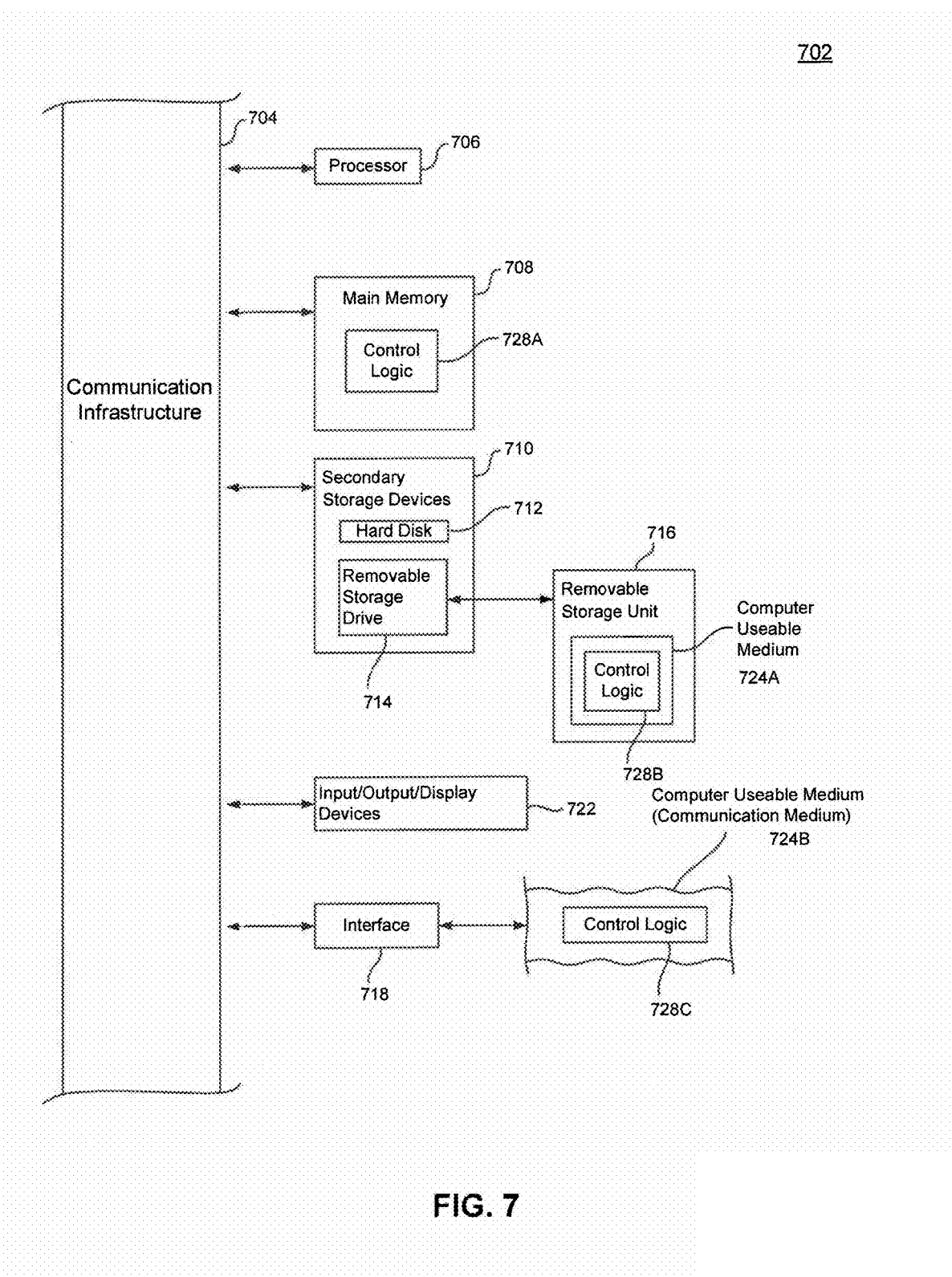
FIG. 7 illustrates an example computer useful for implementing components of the embodiments.

FIG. 7 illustrates an example computer useful for implementing components of the embodiments.

In an embodiment, the system and components of embodiments described herein are implemented using well known computers, such as computer 702 shown in FIG. 7. For example, database servers 100A, 100B . . . 100N, client 104A, 104B . . . 104N, primary database 108, and any modules therein can be implemented using one or more computers 702.

The computer 702 can be any commercially available and well known computer capable of performing the functions described herein, such as computers available from International Business Machines, Apple, Sun, HP, Dell, Compaq, Cray, etc.

The computer 702 includes one or more processors (also called central processing units, or CPUs), such as a processor 706. The processor 706 is connected to a communication infrastructure 704.

The computer 702 also includes a main or primary memory 708, such as random access memory (RAM). The primary memory 708 has stored therein control logic 728A (computer software), and data.

The computer 702 also includes one or more secondary storage devices 710. The secondary storage devices 710 include, for example, a hard disk drive 712 and/or a removable storage device or drive 714, as well as other types of storage devices, such as memory cards and memory sticks. The removable storage drive 714 represents a floppy disk drive, a magnetic tape drive, a compact disk drive, an optical storage device, tape backup, etc.

The removable storage drive 714 interacts with a removable storage unit 716. The removable storage unit 716 includes a computer useable or readable storage medium 724 having stored therein computer software 728B (control logic) and/or data. Removable storage unit 716 represents a floppy disk, magnetic tape, compact disk, DVD, optical storage disk, or any other computer data storage device. The removable storage drive 714 reads from and/or writes to the removable storage unit 716 in a well-known manner.

The computer 702 also includes input/output/display devices 722, such as monitors, keyboards, pointing devices, etc.

The computer 702 further includes a communication or network interface 718. The network interface 718 enables the computer 702 to communicate with remote devices. For example, the network interface 718 allows the computer 702 to communicate over communication networks or mediums 724B (representing a form of a computer useable or readable medium), such as LANs, WANs, the Internet, etc. The network interface 718 may interface with remote sites or networks via w'red or wireless connections.

Control logic 728C may be transmitted to and from the computer 702 via the communication medium 724B.

Any apparatus or manufacture comprising a computer useable or readable medium having control logic (software) stored therein is referred to herein as a computer program product or program storage device. This includes, but is not limited to, the computer 702, the main memory 708, secondary storage devices 710, the removable storage unit 716 and the carrier waves modulated with control logic 730. Such computer program products, having control logic stored therein that, when executed by one or more data processing devices cause such data processing devices to operate as described herein, represent embodiments.

The embodiments can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments contemplated by the inventor(s), and thus, are not intended to limit the present embodiments and the appended claims in any way.

The present embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
providing table parameterized function (TPF) functionality in a database having defined therein a TPF, wherein the definition of the TPF defines one or more parameters of the TPF, at least one of the parameters being a table parameter;
receiving a query that operates to call the TPF to process information from a producer, wherein the query defines one or more input parameters, the input parameters comprising at least one table input parameter to be used as input for calling the TPF, wherein the table parameter comprises a set of rows from a table of the database;
processing the query to produce a result, wherein the processing comprises executing two or more rows of the table input parameter in parallel;
marking data of the table indicated by the table input parameter that is not to be provided to a consumer as unavailable without deleting the data from a memory structure, wherein the marking of the data of the memory structure consumes fewer processing resources compared to removing the data of the table that is not to be provided from the memory structure; and
returning access to the memory structure as the result of the query, wherein the memory structure includes at least a portion of the data that has been marked as being unavailable.

2. The computer-implemented method of claim 1, wherein returning the result of the query comprises:
rewinding the result to allow the result to be read multiple times.

3. The computer-implemented method of claim 1, wherein processing the query to produce a result comprises:
transferring a plurality of blocks of row data using a single call from the producer to the consumer.

4. The computer-implemented method of claim 1, wherein processing the query to produce a result comprises:
using metadata responsive to the result of a query between the producer and the consumer to improve efficiency by placing restrictions on the information from the database that is used to process the query, wherein the restrictions include the marking.

5. The computer-implemented method of claim 1, wherein processing the query to produce a result comprises:
negotiating ordering properties for the query between the producer and the consumer, wherein the ordering properties include an already specified ordering for a query input table and an appropriate ordering for the query input table; and
processing the query while enforcing the ordering properties by at least one of the producer and the consumer.

6. The computer-implemented method of claim 1, wherein processing the query to produce a result comprises:
negotiating partitioning properties for the query between the producer and the consumer;

creating separate instances of the table input parameter, each instance comprising a portion of data from the input parameter; and
processing the query in parallel using the separate instances of the table input parameter.

7. The computer-implemented method of claim 1, wherein processing the query to produce a result comprises:
negotiating clustering properties between the producer and the consumer; and
processing the query based on the negotiated clustering properties.

8. The computer-implemented method of claim 1, wherein processing the query to produce a result comprises:
allowing the TPF to dynamically support parallelism or distributed processing when processing the query.

9. The computer-implemented method of claim 1, wherein the set of rows from the table of the database of the table parameter exist within the database prior to the receiving the query.

10. The computer-implemented method of claim 1, wherein the processing comprises transferring a plurality of blocks of row data from the producer to a consumer without data movement.

11. The computer-implemented method of claim 1, wherein the query with the table input parameter is an SQL query.

12. The computer-implemented method of claim 1, wherein results from the parallel execution of the two or more partitions are assembled into the result.

13. The computer-implemented method of claim 1, wherein the providing comprises:
wherein the definition of the TPF defines two or more parameters of the TPF including both a table parameter and a single-value scalar parameter.

14. The computer-implemented method of claim 13, wherein the result of processing the query with the table input parameter is a scalar value.

15. The computer-implemented method of claim 1, wherein the processing is performed without copying the table input parameter.

16. A non-transitory computer-readable device, having instructions stored thereon that when executed by a processor, cause the processor to perform operations comprising:
providing table parameterized function (TPF) functionality in a database having defined therein a TPF, wherein the definition of the TPF defines one or more parameters of the TPF, at least one of the parameters being a table parameter;
receiving a query that operates to call the TPF to process information from a producer, wherein the query defines one or more input parameters, the input parameters comprising at least one table input parameter to be used as input for calling the TPF, wherein the table parameter comprises a set of rows from a table of the database;
processing the query to produce a result, wherein the processing comprises executing two or more rows of the table input parameter in parallel;
marking data of the table indicated by the table input parameter that is not to be provided to a consumer as unavailable without deleting the data from a memory structure, wherein the marking of the data of the memory structure consumes fewer processing resources compared to removing the data of the table that is not to be provided from the memory structure; and
returning access to the memory structure as the result of the query, wherein the memory structure includes at least a portion of the data that has been marked as being unavailable.

17. The non-transitory computer-readable device of claim 16, wherein returning the result of the query comprises:
rewinding the result to allow the result to be read multiple times.

18. The non-transitory computer-readable device of claim 16, wherein processing the query to produce a result comprises:
transferring a plurality of blocks of row data using a single call from the producer to the consumer.

19. The non-transitory computer readable device of claim 16, wherein processing the query to produce a result comprises:
using metadata responsive to the result of a query between the producer and the consumer to improve efficiency by placing restrictions on the information from the database that is used to process the query.

20. The non-transitory computer readable device of claim 16, wherein processing the query to produce a result comprises:
negotiating ordering properties for the query between the producer and the consumer, wherein the ordering properties include an already specified ordering for a query input table and an appropriate ordering for the query input table; and
processing the query while enforcing the ordering properties by at least one of the producer and the consumer.

21. The non-transitory computer readable device of claim 16, wherein processing the query to produce a result comprises:
negotiating partitioning properties for the query between the producer and the consumer;
creating separate instances of the table input parameter, each instance comprising a portion of data from the input parameter; and
processing the query in parallel using the separate instances of the table input parameter.

22. The non-transitory computer readable device of claim 16, wherein processing the query to produce a result comprises:
negotiating clustering properties between the producer and the consumer; and
processing the query based on the negotiated clustering properties.

23. The non-transitory computer readable device of claim 16, wherein processing the query to produce a result comprises:
allowing the TPF to dynamically support parallelism or distributed processing when processing the query.

24. A system, comprising:
a database, configured to provide table parameterized function (TPF) functionality and having defined therein a TPF, wherein the definition of the TPF defines one or more parameters of the TPF, at least one of the parameters being a table parameter;
a processor configured to:
receive a query that operates to call the TPF to process information from a producer, wherein the query defines one or more input parameters, the input parameters comprising at least one table input parameter to be used as input for calling the TPF, wherein the table parameter comprises a set of rows from a table of the database, process the query to produce a result, wherein the processing comprises executing two or more rows of the table input parameter in parallel, mark data of the table indicated by the table input parameter that is not to be provided to a consumer as unavailable without deleting the data from a memory structure, wherein the marking of the data of the memory structure consumes fewer processing resources compared to removing the data of the table that is not to be provided from the memory structure; and return access to the memory structure as the result of the query, wherein the memory structure includes at least a portion of the data that has been marked as being unavailable.

25. The system of claim 24, wherein the processor s further configured to rewind the result to allow the result to be read multiple times.

* * * * *